United States Patent
Hori et al.

(10) Patent No.: US 7,537,265 B2
(45) Date of Patent: May 26, 2009

(54) VEHICLE REAR STRUCTURE

(75) Inventors: Tomohiro Hori, Fuchu-cho (JP); Yuzou Sato, Fuchu-cho (JP); Masanori Kodaira, Fuchu-cho (JP); Tomoo Taguchi, Fuchu-cho (JP); Kou Niida, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 38 days.

(21) Appl. No.: 11/602,502

(22) Filed: Nov. 21, 2006

(65) Prior Publication Data

US 2007/0120391 A1    May 31, 2007

(30) Foreign Application Priority Data

| Nov. 22, 2005 | (JP) | ............................. 2005-336849 |
| Nov. 22, 2005 | (JP) | ............................. 2005-336850 |
| Dec. 5, 2005 | (JP) | ............................. 2005-351117 |
| Dec. 5, 2005 | (JP) | ............................. 2005-351118 |

(51) Int. Cl.
*B60P 7/02*    (2006.01)

(52) U.S. Cl. ................................. 296/100.15

(58) Field of Classification Search ............ 296/100.15, 296/98, 37.16, 24.4, 100.18, 100.16, 100.17, 296/100.01, 100.12; 49/360
See application file for complete search history.

(56) References Cited

U.S. PATENT DOCUMENTS

| 4,127,301 A | * | 11/1978 | Syrowik ................... 296/37.16 |
| 4,289,345 A | * | 9/1981 | Tamamushi et al. ....... 296/37.16 |
| 4,351,555 A | * | 9/1982 | Hashimoto ................ 296/37.16 |
| 4,480,675 A | * | 11/1984 | Berkemeier .............. 296/37.16 |
| 4,668,001 A | * | 5/1987 | Okumura et al. .......... 296/37.16 |
| 4,728,141 A | * | 3/1988 | Motozawa et al. ....... 296/37.16 |

(Continued)

FOREIGN PATENT DOCUMENTS

DE    19854772    5/2000

(Continued)

OTHER PUBLICATIONS

European Search Report, EP 06024151, Dated Feb. 21, 2007.

*Primary Examiner*—Kiran B. Patel
(74) *Attorney, Agent, or Firm*—Studebaker & Brackett PC; Donald R. Studebaker

(57) ABSTRACT

Disclosed is a vehicle rear structure, which is designed such that a pull bar (7) provided at a rear end of a tonneau cover (6) is slidingly displaced along a pair of right and left guide rails (38). The right and left guide rails (8) are positioned parallel to each other in a rear view of the vehicle. Each of the guide rails (8) has an upper portion located at a position overlapping a corresponding one of a pair of right and left rear pillars (18) in the rear view of the vehicle and in front of the rear pillar (18) in a side view of the vehicle, and a lower portion located at a position overlapping the rear pillar (18) in the side view of the vehicle and on the inner side of the rear pillar (18) in the rear view of the vehicle. The vehicle rear structure of the present invention makes it possible to allow the rear end of the tonneau cover to be displaced upwardly and downwardly along the right and left guide rails in a simplified structure without disadvantages, such as deterioration in rearward visibility, due to decrease in distance between the right and left guide rails.

13 Claims, 13 Drawing Sheets

U.S. PATENT DOCUMENTS

| | | | | |
|---|---|---|---|---|
| 4,781,234 A * | 11/1988 | Okumura et al. | | 296/37.16 |
| 4,932,704 A * | 6/1990 | Ament | | 296/37.16 |
| 5,201,810 A * | 4/1993 | Ojima et al. | | 160/265 |
| 5,224,748 A * | 7/1993 | Decker et al. | | 296/37.16 |
| 5,404,926 A * | 4/1995 | Ojima et al. | | 296/97.4 |
| 5,538,306 A * | 7/1996 | Ament | | 296/37.1 |
| 5,547,187 A * | 8/1996 | Spykerman | | 296/37.16 |
| 5,632,520 A * | 5/1997 | Butz | | 296/37.16 |
| 5,676,415 A * | 10/1997 | Ament et al. | | 296/37.16 |
| 5,711,568 A * | 1/1998 | Diem et al. | | 296/37.16 |
| 5,727,836 A * | 3/1998 | Hosoya | | 296/37.16 |
| 6,125,908 A * | 10/2000 | Ament et al. | | 296/37.16 |
| 6,155,621 A * | 12/2000 | Nishida et al. | | 296/24.4 |
| 6,349,986 B1 * | 2/2002 | Seel et al. | | 296/37.16 |
| 6,402,217 B1 * | 6/2002 | Ament et al. | | 296/37.16 |
| 6,416,103 B1 * | 7/2002 | Laudenbach et al. | | 296/37.1 |
| 6,488,325 B1 * | 12/2002 | Ehrenberger et al. | | 296/37.16 |
| 6,592,165 B2 * | 7/2003 | Ament et al. | | 296/37.16 |
| 6,598,921 B2 * | 7/2003 | Seel et al. | | 296/37.16 |
| 6,918,623 B2 * | 7/2005 | Hansen et al. | | 296/98 |
| 6,930,592 B2 * | 8/2005 | Schlecht et al. | | 340/426.29 |
| 6,948,760 B2 * | 9/2005 | Marx et al. | | 296/100.12 |
| 6,966,591 B2 * | 11/2005 | Schlecht | | 296/37.16 |
| 7,004,530 B2 * | 2/2006 | Marx et al. | | 296/100.12 |
| 7,021,692 B2 * | 4/2006 | Laudenbach et al. | | 296/76 |
| 7,052,063 B2 * | 5/2006 | Haspel et al. | | 296/37.16 |
| 7,055,877 B2 * | 6/2006 | Sparrer et al. | | 296/37.16 |
| 7,082,983 B2 * | 8/2006 | Coulibaly et al. | | 160/306 |
| 7,140,659 B2 * | 11/2006 | Walter et al. | | 296/37.16 |
| 7,316,440 B2 * | 1/2008 | Walter et al. | | 296/37.16 |
| 2001/0017194 A1 * | 8/2001 | Schlecht et al. | | 160/370.22 |
| 2002/0113452 A1 * | 8/2002 | Ament et al. | | 296/37.16 |
| 2004/0020956 A1 * | 2/2004 | Lobanoff | | 224/497 |
| 2004/0232720 A1 | 11/2004 | Schlecht | | |
| 2004/0245793 A1 * | 12/2004 | Fischer | | 296/24.4 |
| 2006/0232095 A1 * | 10/2006 | Sedighzadeh | | 296/98 |
| 2007/0007783 A1 * | 1/2007 | Schlecht | | 296/24.4 |
| 2007/0096487 A1 * | 5/2007 | Woerner | | 296/37.16 |
| 2007/0182190 A1 * | 8/2007 | Walter et al. | | 296/37.16 |

FOREIGN PATENT DOCUMENTS

| | | |
|---|---|---|
| EP | 1479564 | 11/2004 |
| EP | 1524153 | 4/2005 |
| EP | 1574394 | 9/2005 |

* cited by examiner

VEHICLE REAR STRUCTURE

BACKGROUND OF THE INVENTION

1. Field of the Invention

The present invention relates to a vehicle rear structure equipped with a tonneau cover adapted to be disposed to cover an upper side of a rear cargo compartment, and designed to allow an rear end of the tonneau cover to be moved upwardly and downwardly.

2. Description of the Related Art

Heretofore, there has been known a vehicle rear structure which comprises a tailgate swingably supported about a horizontal shaft pivotally attacked to a vehicle body, and adapted to cover a rear opening of the vehicle body, a tonneau cover (roll blind) for covering a top plane of a rear cargo compartment, a pair of guide rails mounted to the vehicle body along opposite lateral edges of the rear opening, and a pair of sliders (guide slides) detachably engaged with a pull bar provided at a rear end of the tonneau cover, wherein the slider is adapted to be slidingly displaced along the guide rail during a manual operation of opening and closing the tailgate, so as to allow the bull bar to be moved between a lower position where the tonneau cover is closed (tonneau-cover close position) and an upper position where the tonneau cover is opened (tonneau-cover open position), as disclosed in U.S. Pat. No. 6,402,217 B1 (equivalent to Japanese Patent No. 3613581).

In the tonneau cover apparatus disclosed in U.S. Pat. No. 6,402,217 B1, the guide rails are positioned along the respective opposite right and left edges of the rear opening which are inclined in upwardly tapering relation to each other, when viewed from a rear end of the vehicle, ie., in a rear view of the vehicle. That is, a distance between the right and left guide rails changes between when the pull bar is at the tonneau-cover open position where the pull bar has been moved to a relatively upper position through the tailgate opening operation and when the pull bar is at the tonneau-cover close position where the pull bar has been moved to a relatively lower position through the tailgate closing operation. Therefore, in the tonneau cover apparatus disclosed in U.S. Pat. No. 6,402,217 B1, the pull bar is provided with a pair of protrudable pins adapted to protrude laterally in a variable manner, at respective opposite right and left ends thereof. The protrudable pins are designed such that a protruding amount thereof is changed correspondingly to the upward/downward displacement of the pull bar so as to allow the right and left ends of the pull bar to be constantly supported by the guide rails through the protrudable pins and the sliders. Thus, this tonneau cover apparatus has problems about structural complexity, and wobbling in the right and left ends of the pull bar during the upward/downward displacement thereof.

It is contemplated that the right and left guide rails are positioned parallel to each other in the rear view of the vehicle to allow the right and left ends of the pull bar to be constantly supported by the guide rails without providing the protrudable pins at the right and left ends of the pull bar. However, in a vehicle where opposite right and left edges. of a rear opening are inclined in upwardly tapering relation to each other in a rear view of the vehicle, if the right and left guide rails are arranged to extend downwardly and parallel to each other from a position along the rear opening, each lower end of the guide rails will be located at a position protruding inwardly from the rear opening to cause a problem of hindering an operation of putting/taking articles in/out of a rear cargo compartment. Moreover, the reduced distance between the right and left guide rails leads to disadvantages of deterioration in rearward visibility and decrease in width dimension of a tonneau cover to be arranged between the guide rails.

SUMMARY OF THE INVENTION

In view of the above problems, it is an object of the present invention to provide a vehicle rear structure capable of allowing a rear end of a tonneau cover to be displaced upwardly and downwardly along a pair of right and left guide rails in a simplified structure without disadvantages, such as deterioration in rearward visibility, due to decrease in distance between the right and left guide rails.

In order to achieve the above object, as set forth in the one aspect of the invention, the present invention provides a vehicle rear structure which comprises a tailgate adapted to openably cover a rear opening defined between a pair of right and left rear pillars formed in a rear of a vehicle body, a tonneau cover adapted to be disposed to cover an upper side of a rear cargo compartment located in front of the rear opening, a pull bar provided at a rear end of the tonneau cover, and a pair of right and left guide rails slidably supporting respective opposite right and left ends of the pull bar. The pull bar is adapted to be slidingly displaced along the guide rails so as to allow the rear end of the tonneau cover to be moved upwardly and downwardly. The vehicle rear structure is, characterized in that the right and left guide rails are positioned parallel to each other, when viewed from a rear end of the vehicle, i.e., in a rear view of the vehicle. Each of the guide rails has an upper portion located at a position overlapping a corresponding one of the rear pillars in the rear view of the vehicle, and in front of the rear pillar, when viewed from a lateral side surface of the vehicle, i.e., in a side view of the vehicle. Further, each of the guide rails, has a lower portion located at a position overlapping the rear pillar in the side view of the vehicle.

As above, in vehicle rear structure of the present invention as set forth in the $1^{st}$ aspect of the present invention, the right and left guide rails are positioned parallel to each other in a rear view of the vehicle, and the upper portion of the guide rail is located at a position overlapping the rear pillar in the rear view of the vehicle and in front of the rear pillar in a side view of the vehicle. Further, the lower portion of the guide rail is located at a position overlapping the rear pillar in the side view of the vehicle, and on the inside of said rear pillar in the rear view of the vehicle. Thus, the rear end of the tonneau cover can be displaced upwardly and downwardly along the guide rails in a simplified structure without disadvantages, such as deterioration in rearward visibility, due to decrease in distance between the right and left guide rails.

These and other objects, features, and advantages of the present invention will become more apparent upon reading the following detailed description along with the accompanied drawings.

DETAILED DESCRIPTION OF THE PREFERRED EMBODIMENTS OF THE INVENTION

Figure 1:
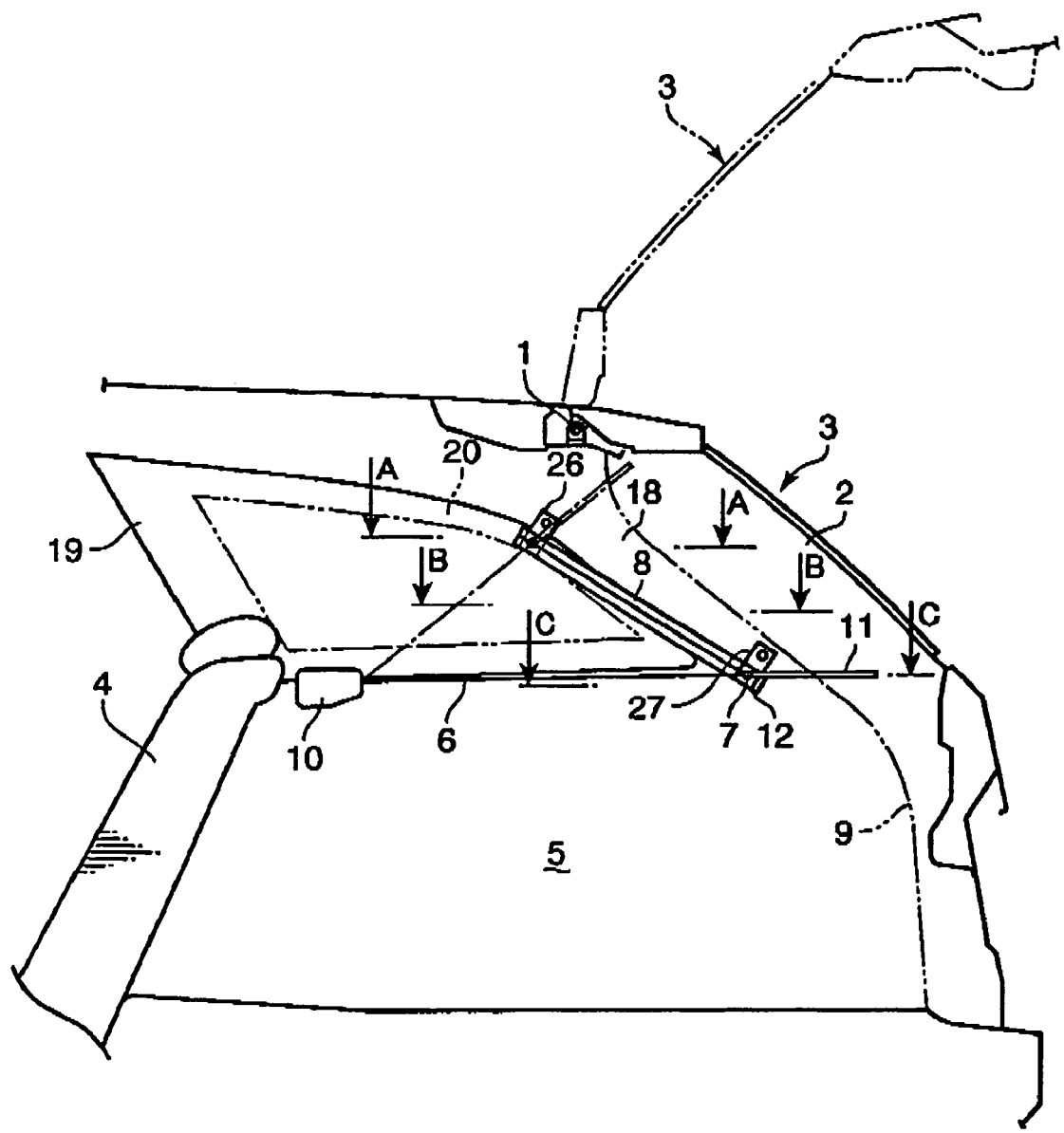
FIG. 1 is a side view showing a vehicle rear structure according to a first embodiment of the present invention.
Figure 2:
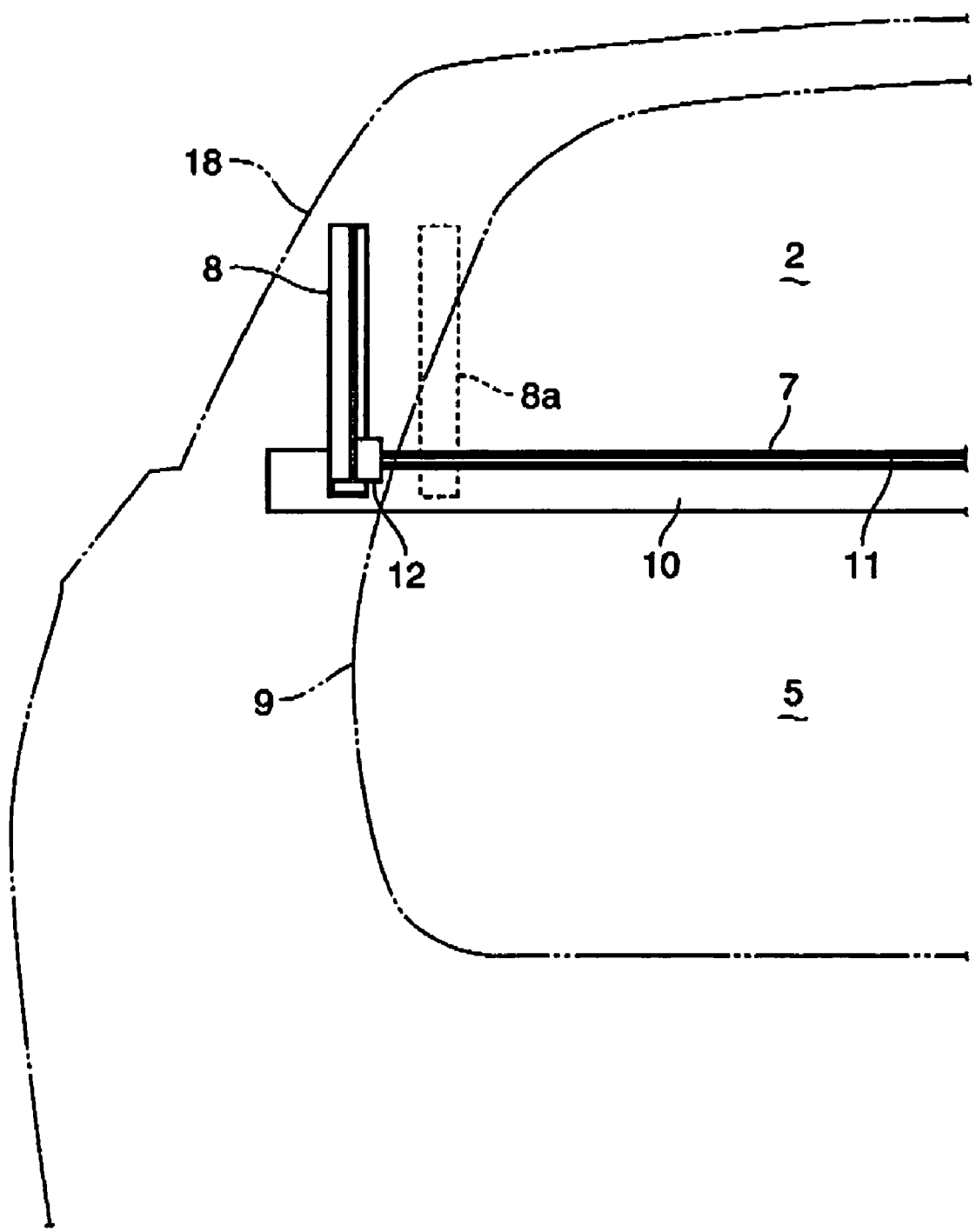
FIG. 2 is a rear view showing the vehicle rear structure according to the first embodiment.
Figure 3:
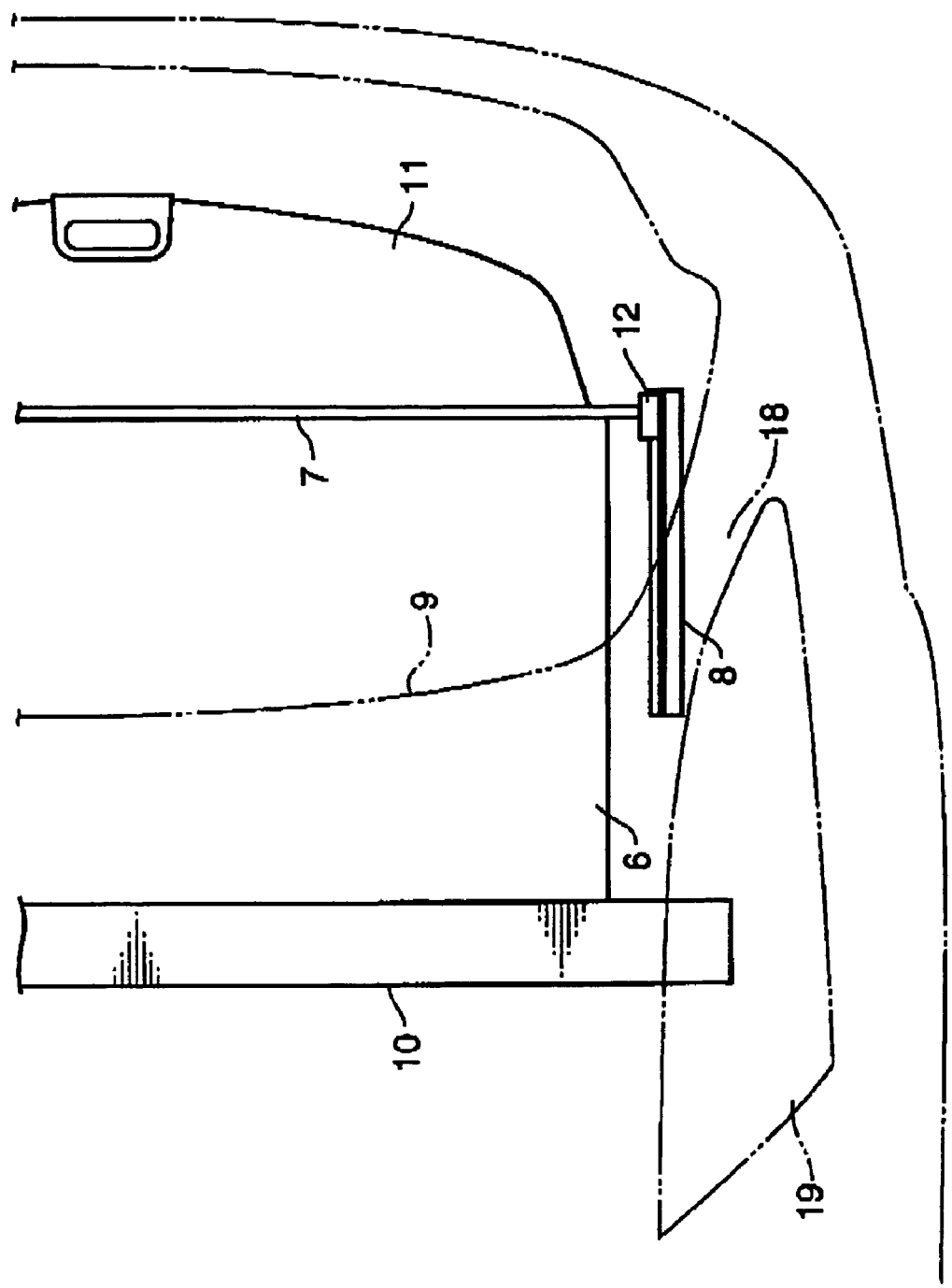
FIG. 3 is a top plan view showing the vehicle rear structure according to the first embodiment.

FIGS. 1 to 3 shows a vehicle rear structure according to a first embodiment of the present invention. This vehicle structure comprises a tailgate 3 adapted to be swingingly displaced about an upper hinge 1 provided in a rear of a vehicle body so as to openably cover a rear opening 2, a tonneau cover 6 adapted to be disposed to cover an upper side of a rear cargo compartment 5 defined in front of the rear opening 2 and in the rear of a seat back 4 of a passenger seat (rear seat), a pull bar 6 provided at a rear end of the tonneau cover 6, and a pair of right and left guide rails 8 slidably supporting respective opposite right and left ends of the pull bar 7. In FIGS. 1 to 3, the reference numeral 9 indicates amounting line of a sealing member to be mounted along a periphery of the rear opening 2.

Figure 4:
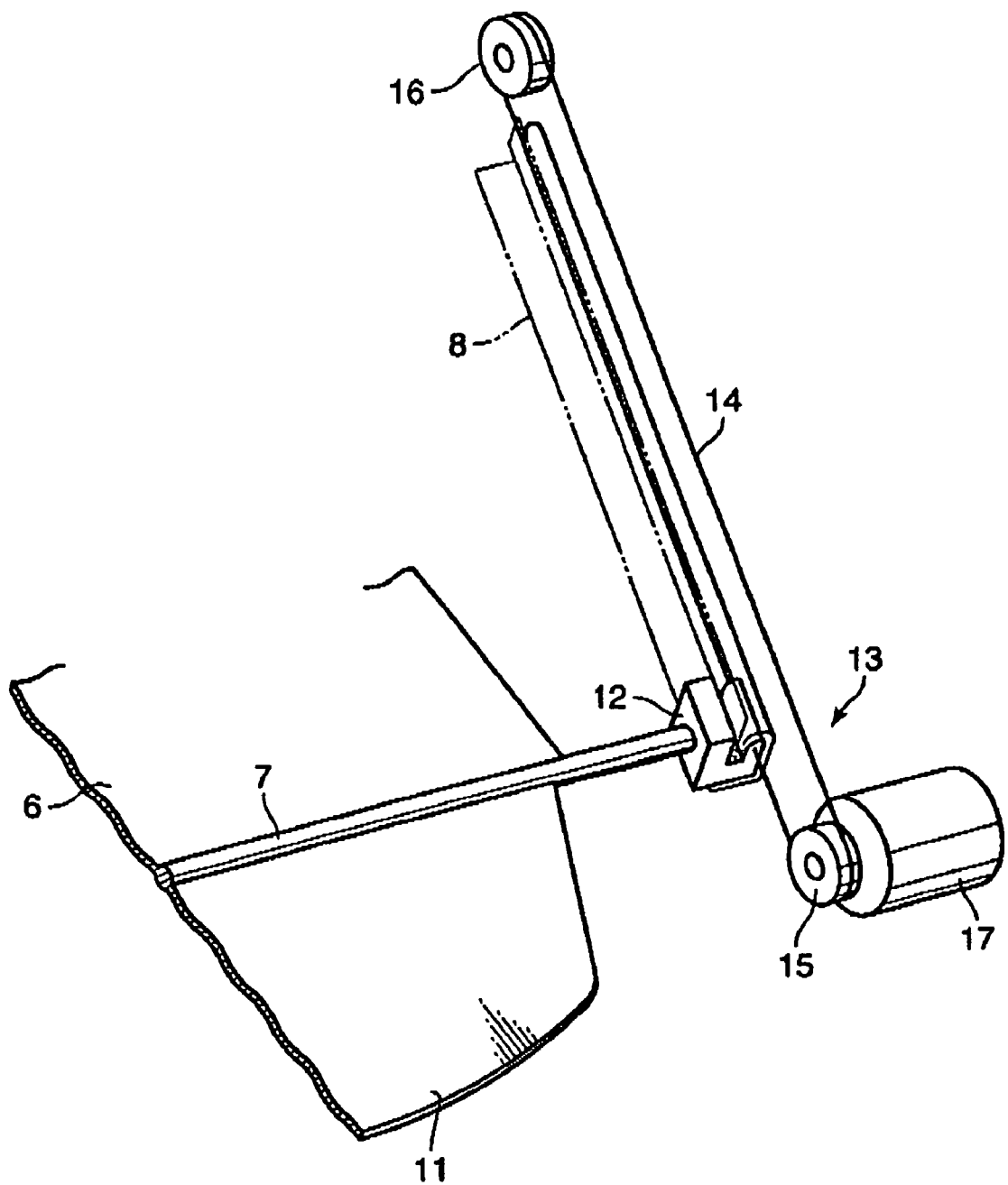
FIG. 4 is a perspective view showing a specific structure of an up-down drive means for slidingly displacing a pull bar.

The tonneau cover 6 comprises a sheet-like member associated with a retracting case 10 positioned along an upper region of a rear surface of the seat back 4, and a pull bar 7 supported by the guide rail 8, so as to extend between the pull bar 7 and the retracting case 10. The retractor case 10 houses a retracting mechanism which applies a biasing force to the tonneau cover 6 in a retracting direction. Specifically, a given tension corresponding to the biasing force of the retracting mechanism is constantly given to the tonneau cover 6, and the tonneau cover 6 is extracted from the retractor case 10 according to an after-mentioned opening/closing operation of the tonneau cover 6. As shown in FIG. 4, a cover plate 11 composed of a synthetic resin plate is integrally formed with the pull bar 7 to protrude from a rear surface of the pull bar 7 so as to cover an upper side of a rear space of the rear cargo compartment 5. A rear end of the tonneau cover 6 is fixed to the pull bar 7 through engagement means (not shown) or the like.

The pull bar 7 has laterally opposite ends each held by a slider 12 adapted to be slidingly displaced along the guide rail 8. Specifically, the slider 12 is adapted to be moved upwardly and downwardly by up-down drive means 13. The up-down drive means 13 comprises: a drive cable 14 extending along the guide rail 8 and having the slider 12 fixed thereto at a given position; a drive roller 15 and a driven roller 16 which are positioned at respective opposite upper and lower ends of the guide rail 8 and wound by the drive cable 14; and a drive motor 17 adapted to rotationally drive the drive roller 15. Thus, the drive roller 15 is rotated according to a driving force of the drive motor 17, and thereby the slider 12 is displaced together with the drive cable 14 to move the pull bar 7 and the rear end of the tonneau cover 6.

As shown in. FIG. 1, each of the right and left guide rails 8 is positioned in a downwardly-inclined posture relative to a rearward direction, when viewed from a lateral side surface of the vehicle, i.e., in a side view of the vehicle. As shown in FIG. 2, the guide rails 8 are positioned parallel to each other along a vertical direction, when viewed from a rear end of the vehicle, i.e., in a rear view of the vehicle. Further, each of the guide rails 8 has an upper portion which is located at a position overlapping a body (an inward sidewall surface of an inner pillar) of a corresponding one of a pair of right and left rear pillars 18 formed in the rear of the vehicle, in the rear view of the vehicle and in front of the rear pillar 18 in the side view of the vehicle (specifically, at a position overlapping a rear edge portion of a quarter window 19 positioned in front of the rear pillar 18 in the side view of the vehicle, and a position adjacent to an inward surface of the quarter window in the rear of the vehicle, as shown in FIG. 1).

That is, in the vehicle having the rear pillars 18 each inclined such that an upper end thereof is located inwardly relative to a lower end thereof in the rear view of the vehicle, the upper portion of the guide rail 18 is located most adjacent to the quarter window 19 in the rear view of the vehicle. Further, the upper portion of the guide rail 18 is located along an opaque light-shielding region 20 formed in a periphery of the quarter window 19 through an application of black ceramic paint or the like, and a portion of the rear pillar 18 on the side of the quarter window 19, i.e., a flange 21 of the rear pillar 18 located at a front edge thereof, as shown in FIG. 5.

The rear pillar 18 includes an outer panel 18a and an inner panel 18b which are formed with flanges 20a, 20b, 21a, 21b. The flanges 20a, 20b and the flanges 21b, 21b are joined together by welding or the like to define a closed section extending vertically in a downwardly-inclined posture relative to the rearward direction in the rear of the vehicle body. Then, the guide rail 8 is positioned in a downwardly-inclined posture relative to the rearward direction with an inclination angle closer to a horizontal direction than that of the rear pillar 18. Thus, as shown in FIGS. 6 and 7, the guide rail 8 has a lower portion which is located at a position overlapping the body of the rear pillar 18 in the side view of the vehicle and on the inside of the rear pillar 18 in the rear view of the vehicle.

As above, in the vehicle having the guide rail 8 positioned in the downwardly-inclined posture relative to the rearward direction in the side view of the vehicle, the guide rail 8 is positioned in a downwardly-inclined posture relative to the rearward direction with an inclination angle closer to a horizontal direction than that of the rear pillar 18. Thus, as shown in FIGS. 6 and 7, the lower portion of the guide rail 8 is located opposed to the body of the rear pillar 18, i.e., a portion of the inner pillar (inner panel) except for the flange 21, in a width or lateral direction of the vehicle, and frontwardly relative to a rear edge of the rear pillar 18. That is, the lower portion of the guide rail 8 is located at a position overlapping the rear pillar 18 in the side view of the vehicle.

Figure 5:
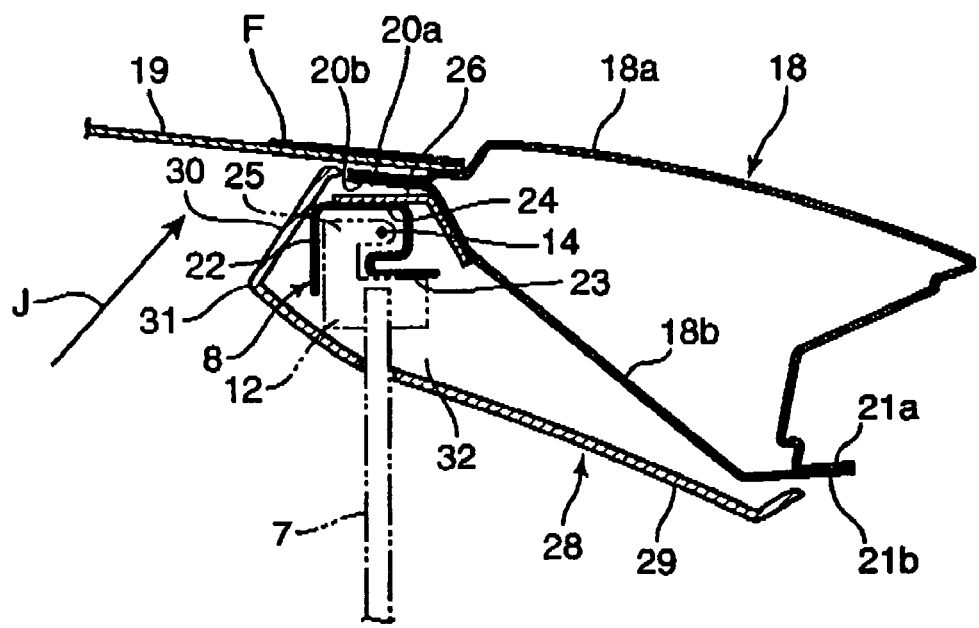
FIG. 5 is a cross-sectional view taken along the line A-A in FIG. 1.
Figure 6:
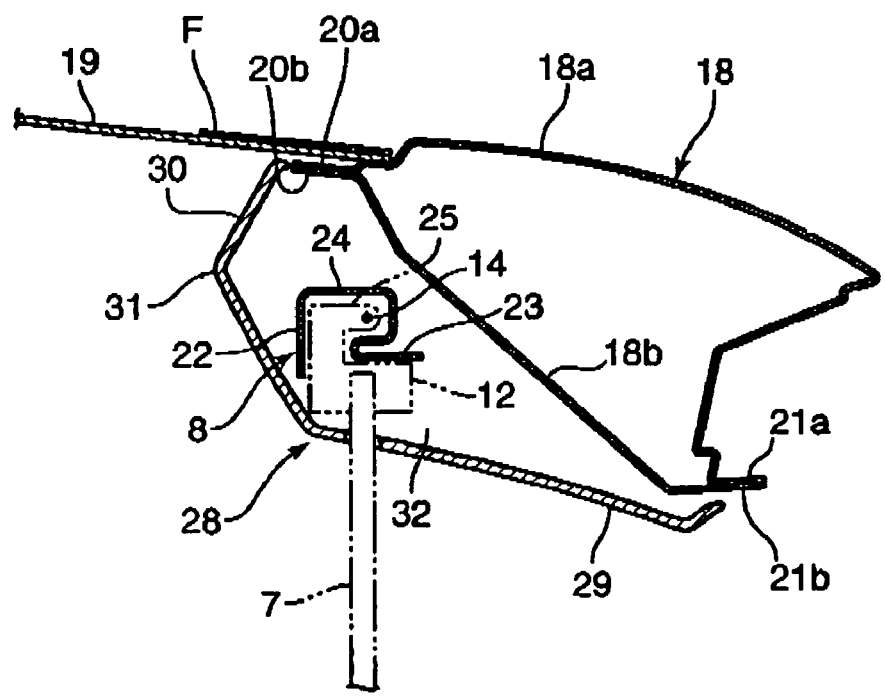
FIG. 6 is a cross-sectional view taken along the line B-B in FIG. 1.
Figure 7:
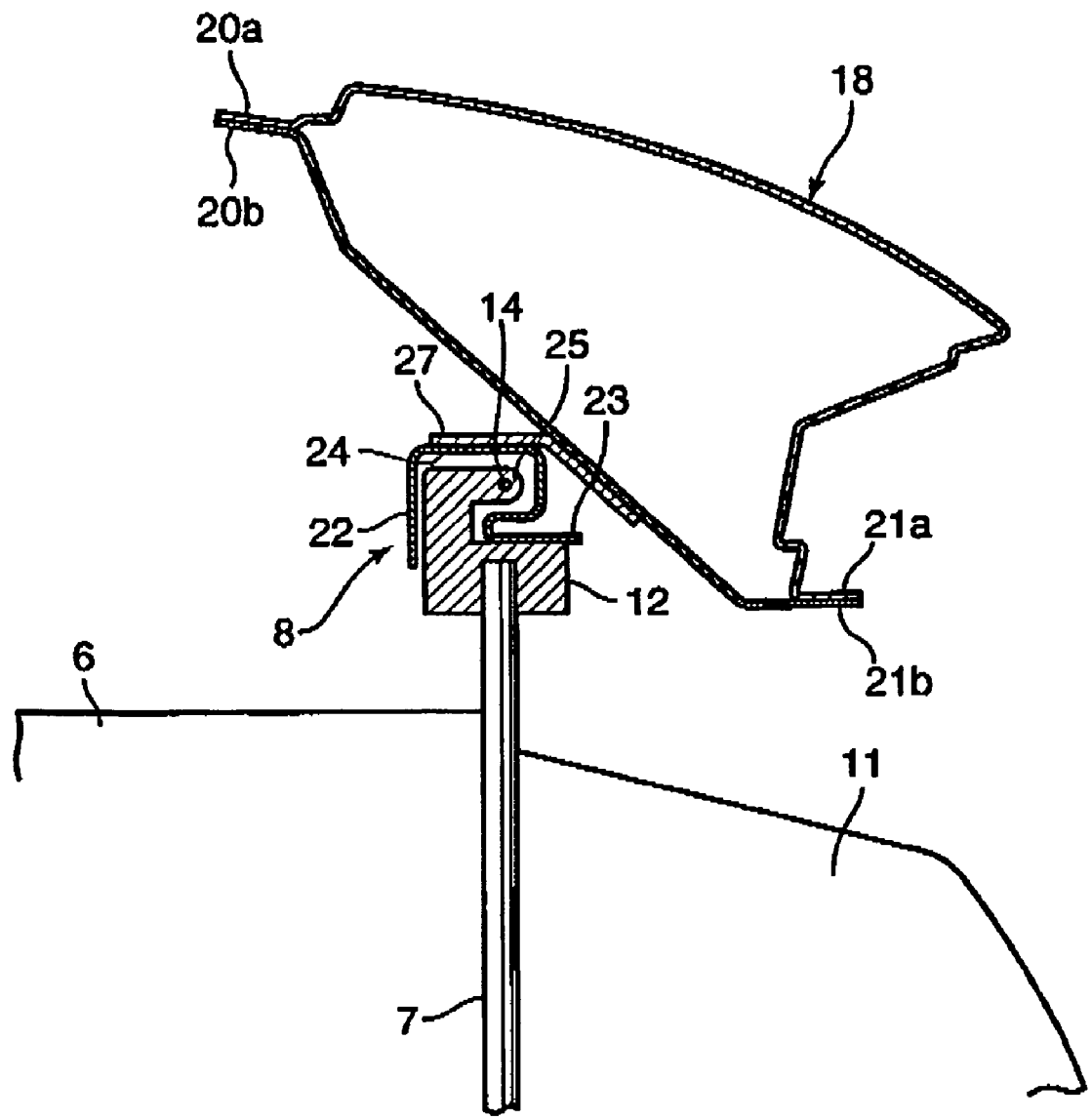
FIG. 7 is a cross-sectional view taken along the line C-C in FIG. 1.

As shown in FIGS. 5 to 7, the guide rail 8 includes a front plate 22 supporting a front surface of the slider 12, a side plate supporting an outward surface of the slider 12, and a guide groove portion 24 continuously extending between the front plate 22 and the side plate 23. Further, a driven portion 25 of the slider 12 to be driven by the drive cable 14 is disposed inside the guide groove portion 24. As shown in FIGS. 5 and 7, the upper and lower portions of the guide rail 8 are mounted to the inward side surface of the rear pillar 18 through mounting brackets 26, 27, respectively.

Figure 8:
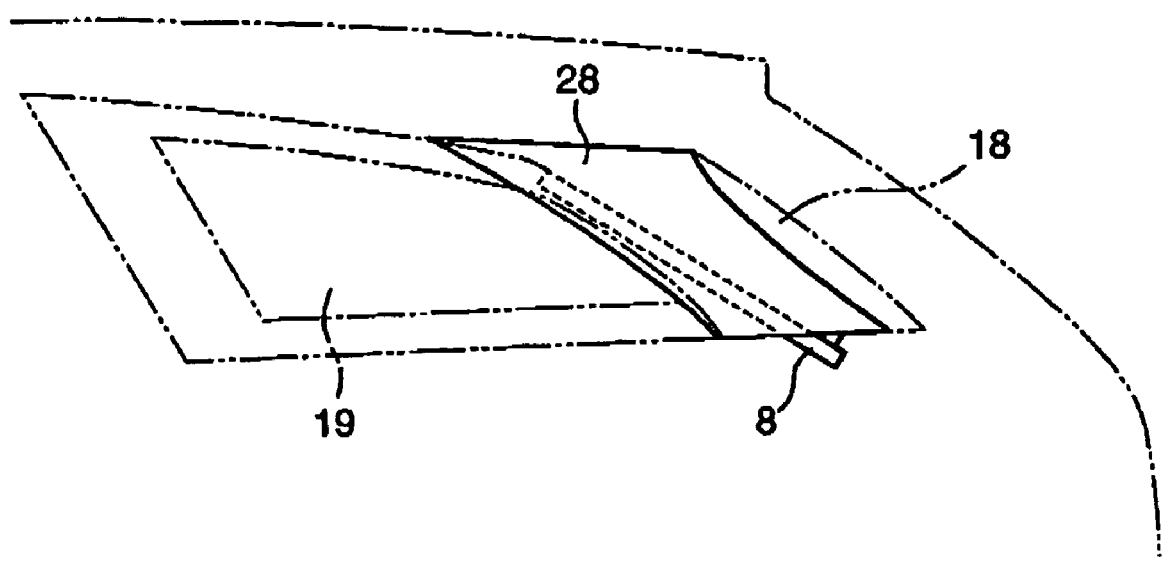
FIG. 8 is a schematic diagram showing a trim member, viewed outwardly from a passenger compartment.

A trim member 28 is disposed on the side of an interior space of the vehicle relative to the rear pillar 18 to cover the inward side surface of the rear pillar 18 (see FIG. 8). As shown in FIGS. 5 and 7, this trim member 28 includes a sidewall plate 29 disposed opposed to the inward sidewall surface of the rear pillar 18, and a front wall plate 30 extending continuously from a front edge of the sidewall plate 29. The sidewall plate 30 of the trim member 28 is disposed in spaced-apart relation to the inner panel 18b of the rear pillar 18 with a given distance therebetween, in such a manner as to extend rearwardly from a front edge thereof in a given inclination direction to have a rear edge located inwardly relative to the front edge, in a horizontal cross-sectional view thereof. The front wall plate 30 is disposed to extend rearwardly in an inclination direction opposite to that of the sidewall plate 29 (i.e., in such a manner as to allow an outward edge thereof to be located on the side of the rear end of the vehicle) to have a rear edge oriented toward a rear edge portion of the quarter window 19.

Thus, the sidewall plate 29 and the front wall plate 30 form a V-shaped protrusion 31 protruding frontwardly in a top plan view of the vehicle, at a front edge of the trim member 28. Further, the sidewall plate 29 of the trim member 28 disposed in spaced-apart relation to the inward sidewall surface of the rear pillar 18 defines a storage space 32 for storing the guide rail 8 and other component, in cooperation with the rear pillar 18.

In the above structure, in response to a manual operation of opening the tailgate 3, an open switch (not shown) is turned on to rotate the drive motor 17 in a normal direction so as to drive the drive roller 15 and the drive cable 14. Thus, the slider 12 fixed to each of the lateral ends of the pull bar 7 is moved upward from a lower position, i.e., a tonneau-cover close position, to an upper position, i.e., a tonneau-cover open position, along the guide rail 8. In this manner, the rear end of the tonneau cover 6 is moved to the upper open position to facilitate an operation of putting/taking articles in/out of the rear cargo compartment 5 (see the tow-dot chain line in FIG. 1).

Then, in response to a manual operation of closing the tailgate 3, a close switch (not shown) is turned on to rotate the drive motor 17 in a reverse direction so as to drive the drive roller 15 and the drive cable 14. Thus, the slider 12 fixed to each of the lateral ends of the pull bar 7 is moved downward from the upper position, i.e., the tonneau-cover open position to the lower position, i.e., the tonneau-cover close position, along the guide rail 8. In this manner, the rear end of the tonneau cover 6 is moved to the lower close position to cover articles in the rear cargo compartment 5 (see the solid line in FIG. 1).

As above, in the vehicle rear structure comprises the tailgate 3 adapted to openably cover the rear opening 2 defined between the pair of right and left rear pillars 18 formed in the rear of the vehicle body, the tonneau cover 6 adapted to be disposed to cover an upper side of the rear cargo compartment 5 located in front of the rear opening 2, the pull bar 7 provided at the rear end of the tonneau cover 6, and the pair of right and left guide rails 8 slidably supporting the respective opposite right and left ends of the pull bar 7, wherein the pull bar 7 is adapted to be slidingly displaced along the guide rails 8 so as to allow the rear end of the tonneau cover 6 to be moved upwardly and downwardly, the right and left guide rails 8 are positioned parallel to each other in the rear view of the vehicle, and the upper portion of each of the guide rails 8 is located at a position overlapping a corresponding one of the rear pillars 18 in the rear view of the vehicle and in front of the rear pillar 18 in the side view of the vehicle. Further, the lower portion of the guide rail 8 is located at a position overlapping the rear pillar 18 in the side view of the vehicle and on the inside of said rear pillar 18 in the rear view of the vehicle. Thus, the rear end of the tonneau cover 6 can be displaced upwardly and downwardly along the guide rails 8 in a simplified structure without disadvantages, such as deterioration in rearward visibility, due to decrease in distance between the right and left guide rails 8.

More specifically, the rear pillar 18 positioned in the side (lateral) edge of the rear opening 2 is inclined such that the upward end is located inwardly in the rear view of the vehicle. Thus, if the right and left guide rails 8a as indicated by the broken line in FIG. 2 are positioned parallel to each other and located inwardly relative to the rear pillar 18 in the entire length thereof, lower ends of the guide rails 8a will inevitably protrude inwardly toward the rear opening 2. In contrast, when the upper portion of the guide rail 8 is located at a position overlapping a corresponding one of the rear pillars 18 in the rear view of the vehicle and in front of the rear pillar 18 in the side view of the vehicle, the guide rails 8 can be positioned parallel to each other while preventing interference with the rear pillar 18 having inwardly-inclined upper end, and sufficiently assuring the distance therebetween.

Thus, the pull bar 7 can be slidingly displaced smoothly along the guide rails 8 while constantly supporting the right and left ends of the pull bar 7 by the guide rails 8 without employing a complicated mechanism, such as the protrudable pins 8 capable of protruding in a variable manner as disclosed in the aforementioned conventional technique. Further, the above vehicle rear structure can prevent deterioration in rearward visibility and in user-friendliness during an operation of putting and taking articles in/out of the rear cargo compartment 5, due to obstruction/hindrance of the guide rails 8 and sufficiently ensure a width dimension of the tonneau cover 6 to be disposed between the guide rails 8.

The lower portion of the rear pillar 18 is located outwardly relative to the upper portion thereof. Thus, the lower portion of the guide rail 8 can be located at a position overlapping the rear pillar 18 in the side view of the vehicle, and on the inside of said rear pillar 18 in the rear view of the vehicle. When the lower portion of the guide rail 8 is located at a position overlapping the rear pillar 18 in the side view of the vehicle, the pull bar 7 can be moved to a rearward position by slidingly displacing the pull bar 7 along the guide rails 8 to the tonneau-cover close position, so as to provide an advantage of being able to effectively cover articles in the rear cargo compartment 5 by the tonneau cover 6.

In the first embodiment, in the vehicle having the quarter window 19 positioned in front of the rear pillar 18, the upper portion of the guide rail 8 is located at a position overlapping the quarter window 19 in the side view of the vehicle, and at a position adjacent to an inward surface of the quarter window 19 in the rear view of the vehicle. This vehicle rear structure has an advantage that the distance of the right and left guide rails 8 can be further increased while preventing the upper portion of the guide rail 8 from interfering with the rear pillar 18.

Particularly, in the vehicle having the opaque light-shielding region 20 in the periphery of the quarter window 19 as in the first embodiment, when the upper portion of the guide rail 8 is located at a position overlapping the light-shielding region 20 in the side view of the vehicle, the light-shielding region 20 can advantageously prevent the guide rail 8 from becoming visible from outside through the quarter window 19 even if the upper portion of the guide rail 8 is located adjacent to the inward surface of the quarter window 19 in the side view of the vehicle. Thus, an aesthetic appearance of the vehicle can be adequately maintained.

In the first embodiment, in the vehicle having the rear pillar 18 inclined such that an upper end thereof is located inwardly relative to a lower end thereof in the rear view of the vehicle, the guide rail 18 is positioned such that the upper portion thereof is located most adjacent to the quarter window 19. Thus, this vehicle rear structure can prevent the guide rail 8 from interfering with the rear pillar 18, and can maximize the distance between the right and left guide rails 8 while allowing the guide rails 8 to be positioned parallel to each other.

Further, when the upper portion of the guide rail 8 is located along the flange 21 of the rear pillar 18 formed on the side of the quarter window 19 as in the first embodiment, the upper portion of the guide rail 8 can be arranged while keeping away from the body (inward sidewall surface) of the rear pillar 18. Thus, this vehicle rear structure has advantages of being able to ensure the distance between the right and left guide rails 8 while preventing the guide rail 8 from interfering with the rear pillar 18, and to effectively prevent the guide-rail 8 from becoming visible from outside through the quarter window 19.

In the first embodiment, in the vehicle rear structure including the outer panel 18a and the outer panel 18b which have flanges 20a, 20b, 21a, 21b joined together to form the rear pillar 18 in such a manner as to extend vertically in the rear of the vehicle body, the quarter window 19 positioned in front of the rear pillar 18, and the trim member covering the inward sidewall surface of the rear pillar 18, the trim member has the sidewall plate 29 extending rearwardly from a front edge thereof in a given inclination direction to have a rear edge located inwardly relative to the front edge, in a horizontal cross-sectional view thereof, and the front wall plate 30 extending continuously and rearwardly from the front edge of the sidewall plate in an inclination direction opposite to that of the sidewall plate 29 to have a rear edge oriented toward a rear edge portion of the quarter window 19. Thus, the inward sidewall surface of the rear pillar 18 can be advantageously covered by the trim member 28 without deterioration in rearward visibility.

Specifically, an outwardly-oriented visual line of a passenger seated in a passenger seat disposed in front of the rear pillar 18 is oriented rearwardly, i.e., a visual line J of the passenger viewing the outside through the quarter window 19 positioned in front of the rear pillar 18, is directed in a rearward and outward direction which is aliened with the inclination direction of the front wall plate 30. Thus, in the case where the trim member 28 is disposed to cover the inward wall surface of the rear pillar 18, the above vehicle rear structure has an advantage of being able to effectively prevent the visual line J of the passenger from being blocked due to the presence of the front wall plate 30 so as to adequately ensure visibility through the quarter window 19.

The chevron-shaped protrusion 31 composed of the sidewall plate 29 and the front wall plate 30 of the trim member 28 is formed at the front edge of the trim member 28 in the top plan view of the vehicle, and the sidewall plate 29 of the trim member 28 is disposed in spaced-apart relation to the inward wall surface of the rear pillar 18 to define the given storage space 32 between the trim member 28 and the rear pillar 18. Thus, the above vehicle rear structure has advantages of being able to define a relatively large storage space 32 between the trim member 32 and the rear pillar 18 while preventing the visual line J of the passenger due to the presence of the trim member 28, and store the guide rail 8, wire harnesses and other component using the storage space.

In place of the above structure designed to rotationally drive the drive roller 15 according to the driving force of the drive motor 17 so as to slidingly displace the slider 12 along the guide rail 8 together with the drive cable 14, a screw-type feed control mechanism adapted to screw-feed the slider 12, or up-down means having a drive cylinder adapted to push and pull the slider 12, may be used for displacing the pull bar 7 upwardly and downwardly along the guide rails based on the opening/closing operation of the tailgate 3. Alternatively, the slider 12 may be slidingly displaced by a passenger's manual operation after the opening/closing operation of the tailgate 3 to displace the pull bar 7 upwardly and downwardly.

The first embodiment has been described based on one example where a given retracting tension is given to the tonneau cover 6 using a retracting mechanism housed in the retractor case positioned along the upper portion of the rear surface of the seat back 4 so as to prevent the tonneau cover 6 from sagging when the pull bar 7 is slidingly displaced along the guide rails based on the opening/closing operation of the tailgate 3. In place of this structure, the tonneau cover 6 may be made of a stretchable material to prevent the sagging, of the tonneau cover 6 in response to the upward/downward movement without providing the above retracting mechanism.

Figure 9:
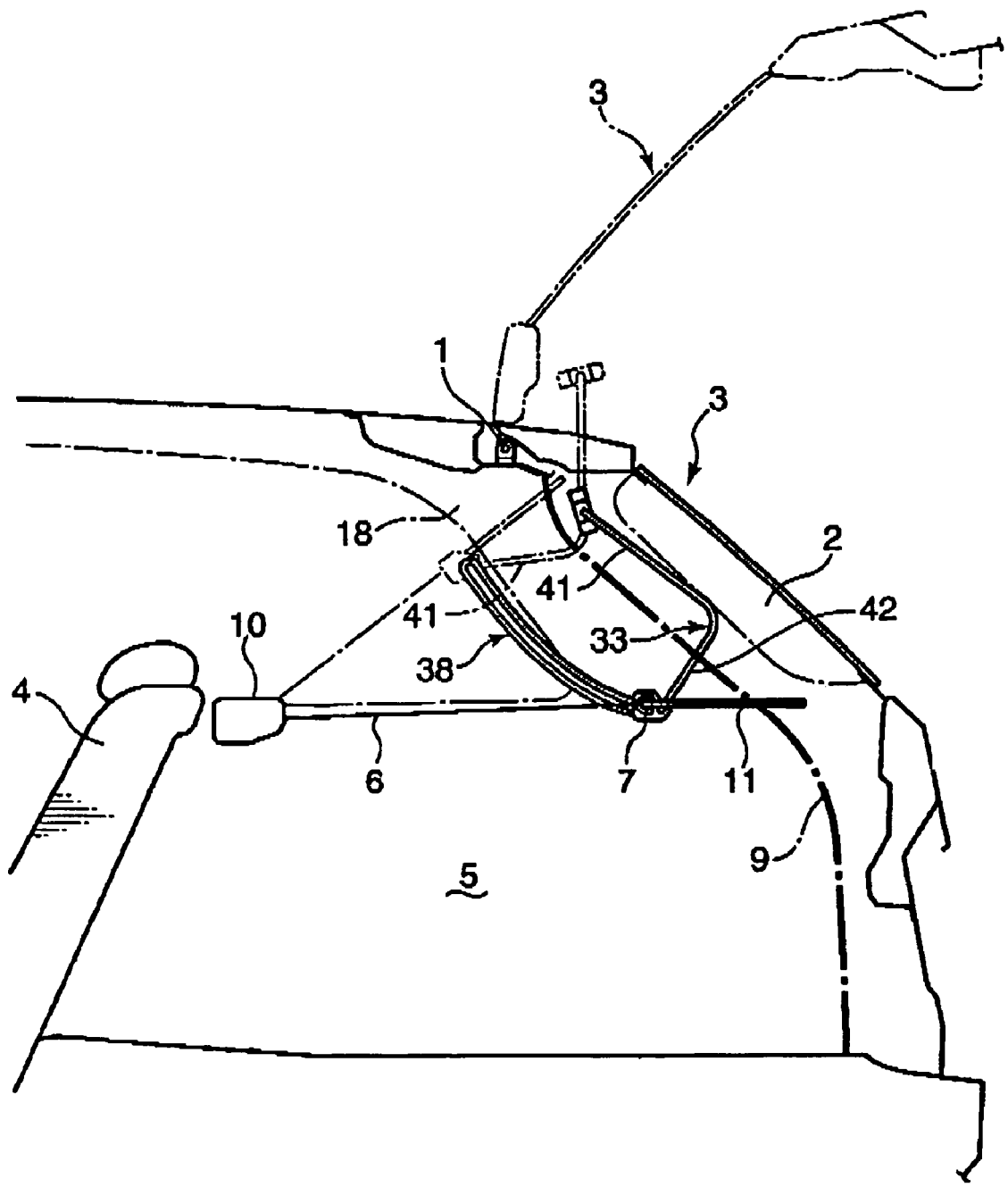
FIG. 9 is a side view showing a tonneau-cover opening/closing mechanism according to a second embodiment of the present invention.
Figure 10:
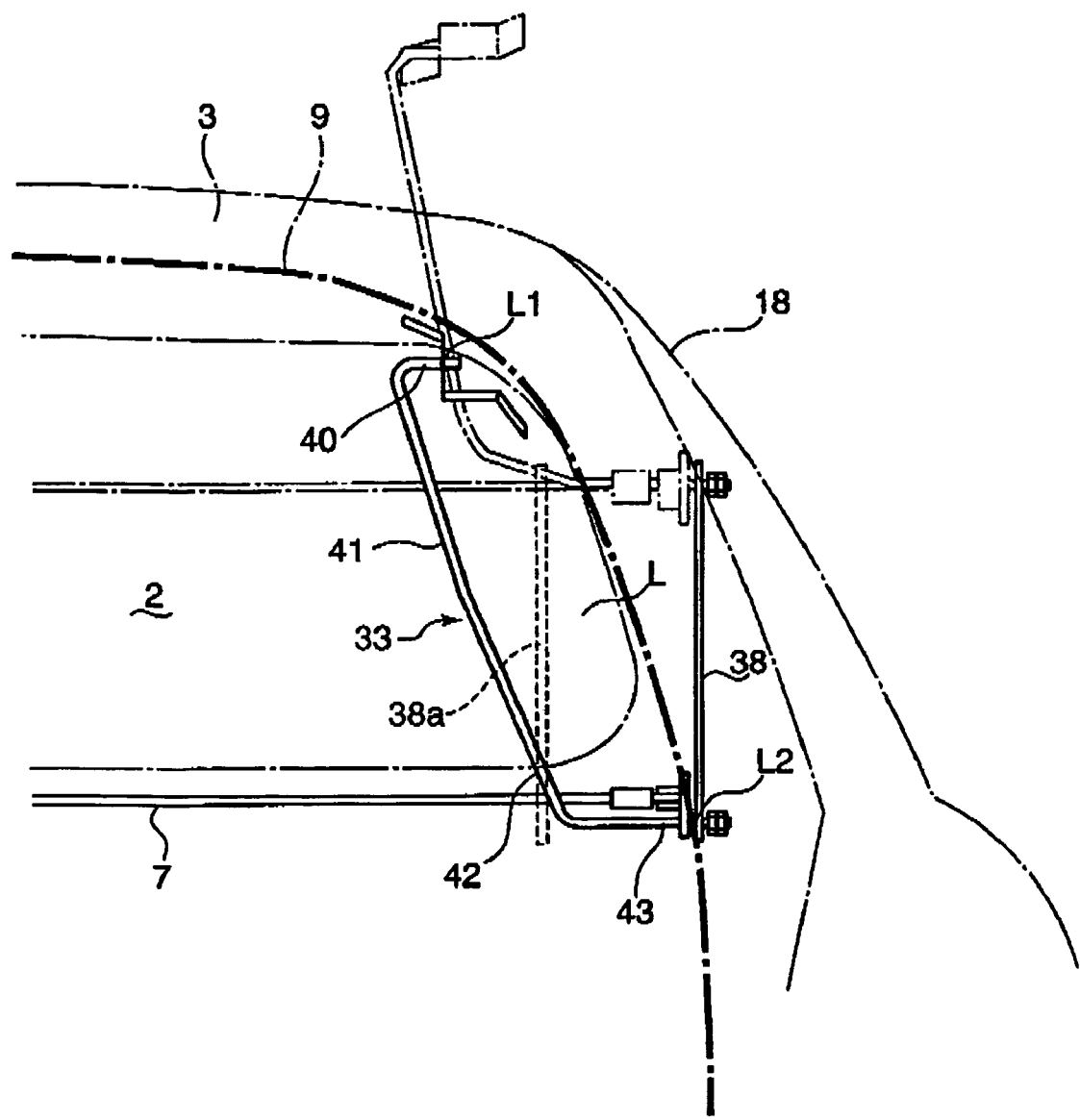
FIG. 10 is a rear view showing the tonneau-cover opening/closing mechanism according to the second embodiment.
Figure 11:
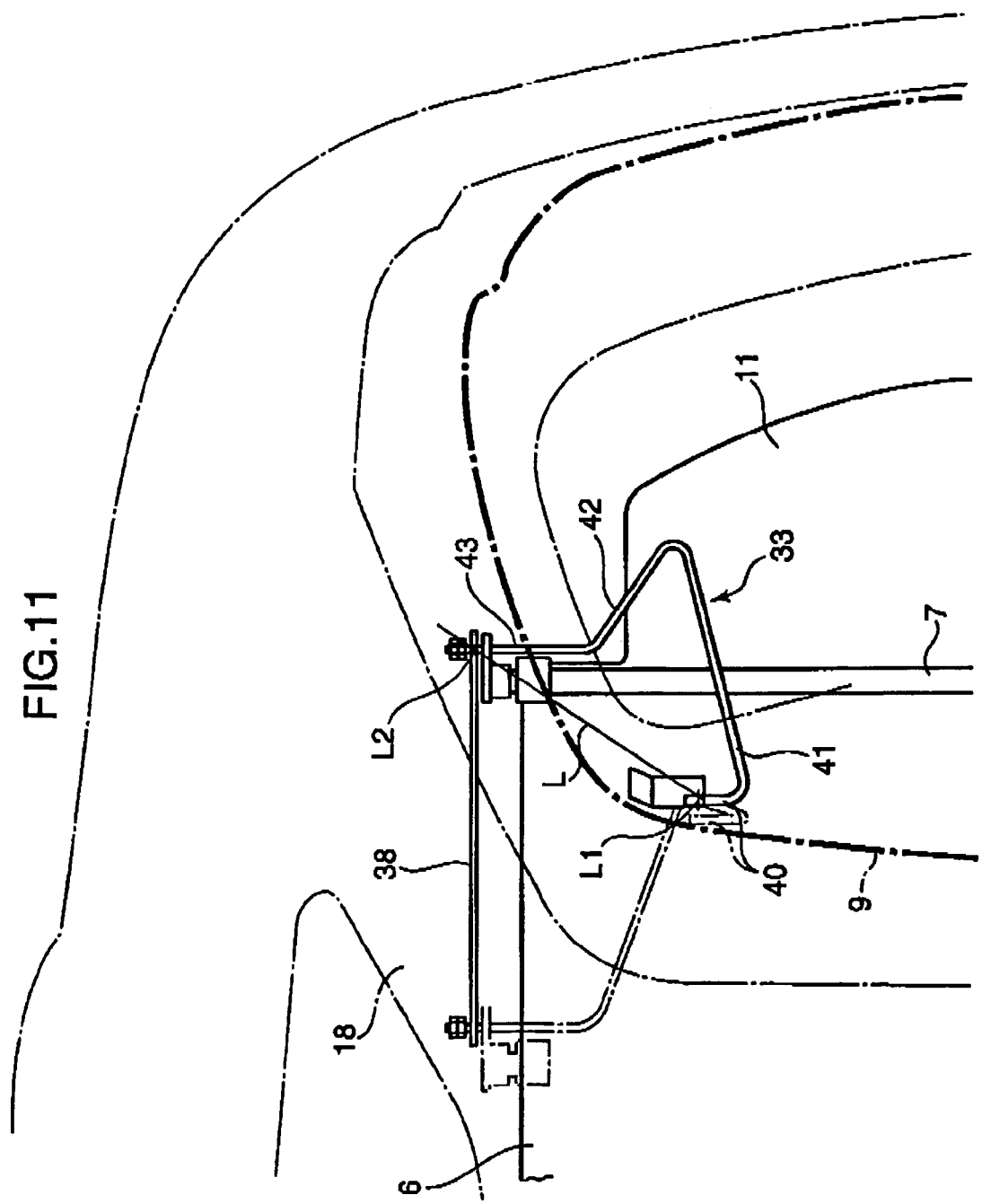
FIG. 11 is a top plan view showing the tonneau-cover opening/closing mechanism according to the second embodiment.
Figure 12:
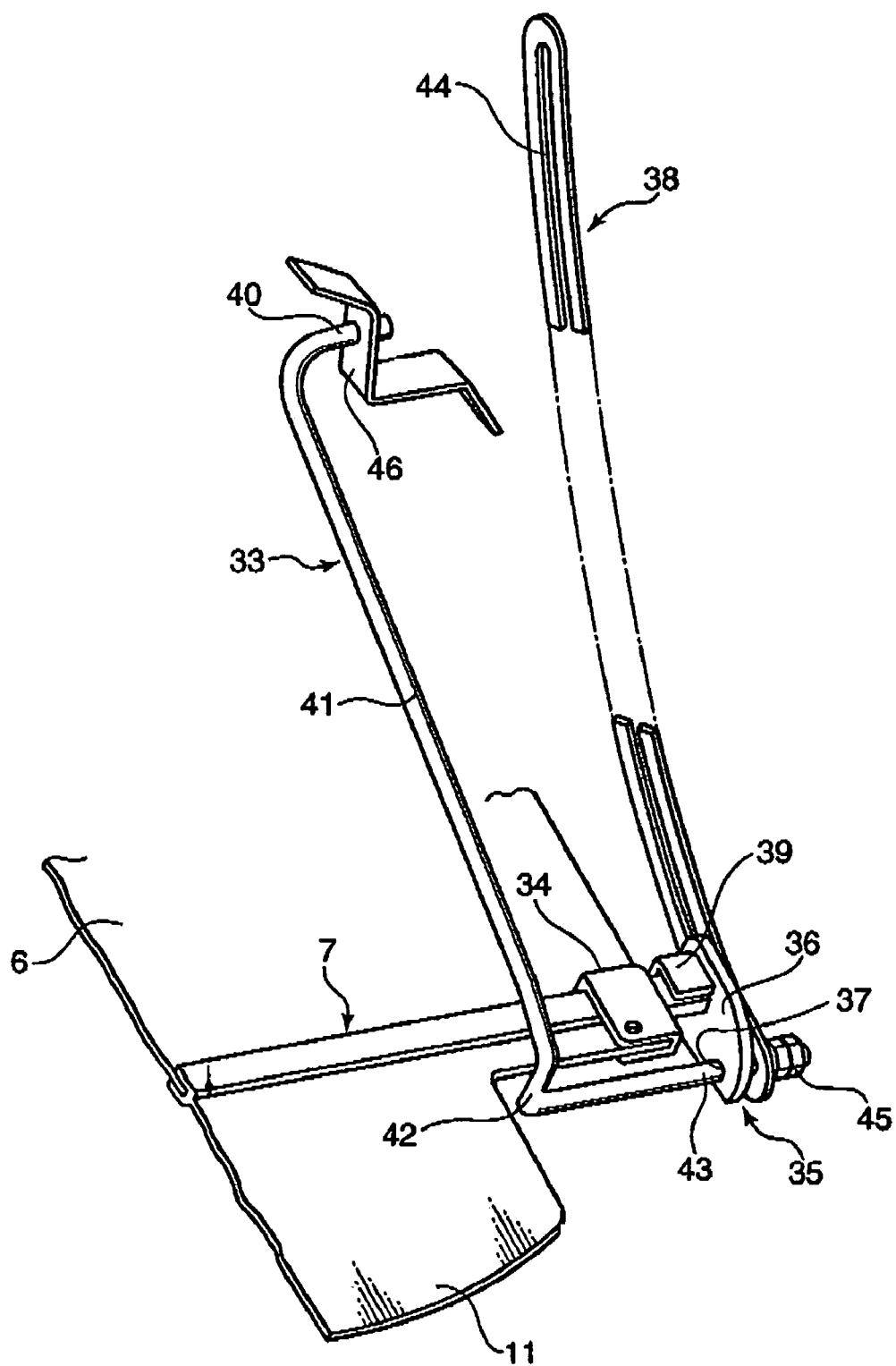
FIG. 12 is a perspective view showing a specific structure of a coupling lever and a guide lever.

FIGS. 9 to 11 show a tonneau-cover opening/closing mechanism according to a second embodiment of the present invention. This embodiment is generally different from the first embodiment in the following points. In this tonneau-cover opening/closing mechanism, the opposite right and left ends of the pull bar 7 provided at the rear end of the tonneau cover 6 are coupled to the tailgate 3 so that a drive force based on the opening/closing operation of the tailgate 3 is transferred to the pull bar 7 to slidingly displace the pull bar 7 along a guide rail 38. Further, the tonneau-cover opening/closing mechanism includes a coupling link 33 adapted to move the rear end of the tonneau cover 6 in conjunction with the above movement, and a reinforcing member 34 made of a synthetic resin and disposed on the side of a coupling portion between the tonneau cover 6 and the pull bar 7. A lateral portion of the rear end of the tonneau cover 6 and a lateral portion of the pull bar 7 are integrally clamped by the reinforcing member 34.

Further, each of the lateral ends of the pull bar 7 is provided with a connection bracket 35 for connecting the tonneau cover 6 to the coupling link 33. This connection bracket 35 includes a base plate 36 slidably supported along an inside surface of the guide rail 38. An engagement hole 37 for the coupling link 33 is formed in a rear portion of the base plate, and a U-shaped engagement portion 39 having a rear end with an opening is formed on an inward surface of the base plate 36 to protrude inwardly from the inward surface. The lateral end of the pull bar 7 is disengageably engaged with the engagement portion 39, and this engaged state of the pull bar 7 is held by the biasing force of the retracting mechanism.

The coupling link 33 includes an upper-end pivoted portion 40 extending horizontally, a downwardly-extending portion 41 extending obliquely rearwardly and downwardly from an inward end of the upper-end pivoted portion 40, a bent portion 42 extending obliquely frontwardly and downwardly from a lower end of the downwardly-extending portion 41, and a lower-end pivoted portion 43 extending horizontally and outwardly from a lower end of the bent portion 42. For example, the coupling link 33 is prepared by subjecting a round bar to a bending process.

The lower-end pivoted portion 43 of the coupling link 33 has an outward end inserted into the engagement hole 37 of the connection bracket 35 and a guide groove of the guide rail 38. A nut 45 is screwed on the inserted end to provide an engagement between the lower-end pivoted portion 43 and the guide rail 38. Further, the upper-end pivoted portion 40 of the coupling link 33 has an outward end mounted to an inward surface of the tailgate 3 through a mounting bracket 46 to allow the pull bar 7 to be coupled to the tailgate 3.

In the coupling link 33, a protruding amount of the lower-end pivoted portion 43 is set at a value greater than that of the upper-end pivoted portion 40. Further, each of the downwardly-extending portion 41 and the bent portion 42 is disposed in a inclined posture to extend downwardly and outwardly in the rear view of the vehicle. Thus, as shown in FIGS. 10 and 1, a rail-side pivoted point L2, i.e., a coupling point of the lower-end pivoted portion 43 to the connection bracket 35, is located outwardly relative to a tailgate-side pivoted point L1, i.e., a coupling point of the upper-end pivoted portion 40 to the tailgate 3. Further, the downwardly-extending portion 41 of the coupling link 33 is located inwardly relative to the side (lateral) edge of the rear opening 2. An imaginary line L connecting the tailgate-side pivoted point L1 and the rail-side pivoted point L2 is inclined to be located laterally outwardly more and more toward a lower end. That is, the imaginary line L is located along the rear pillar 18 defining the side edge of the rear opening 2 inclined in an upwardly-tapering manner.

The coupling link 33 is positioned such that the bent portion 42 thereof extends obliquely frontward relative to the downwardly-extending portion 41. Thus, as shown in FIG. 9, in the side view of the vehicle, the coupling link 33 has a vertically intermediate portion formed in an L shape protruding rearwardly. Further, as shown in FIG. 10, in the rear view of the vehicle, the downwardly-extending portion 41 and the bent portion 42 of the coupling link 33 is located inclinedly in a downwardly-tapering manner to allow the coupling link 33 to be disposed along the inward surface of the rear pillar 18 forming the side edge of the rear opening 2 when the tailgate 18 is closed.

The guide rail 38 is formed of a plate member or the like having the guide groove 44 allowing the lower-end pivoted portion 43 of the coupling link 33 to slidingly move thereal-ong. Further, the guide rail 38 is formed to have a vertically central portion curved to protrude frontwardly and downwardly, in the side view of the vehicle, and the right and left guide rails 38 are positioned parallel to each other along a vertical direction. Furthermore, the guide rail 38 is formed to have a pull-bar guide direction for guiding the pull-bar 7, which is arranged such that, during the closing operation of the tailgate 3, an angle between the pull-bar guide direction and an input direction of a closing operation-based driving force to be applied from the coupling link 33 and the connection bracket 35 thereto, is set at an obtuse angle.

Figure 13:
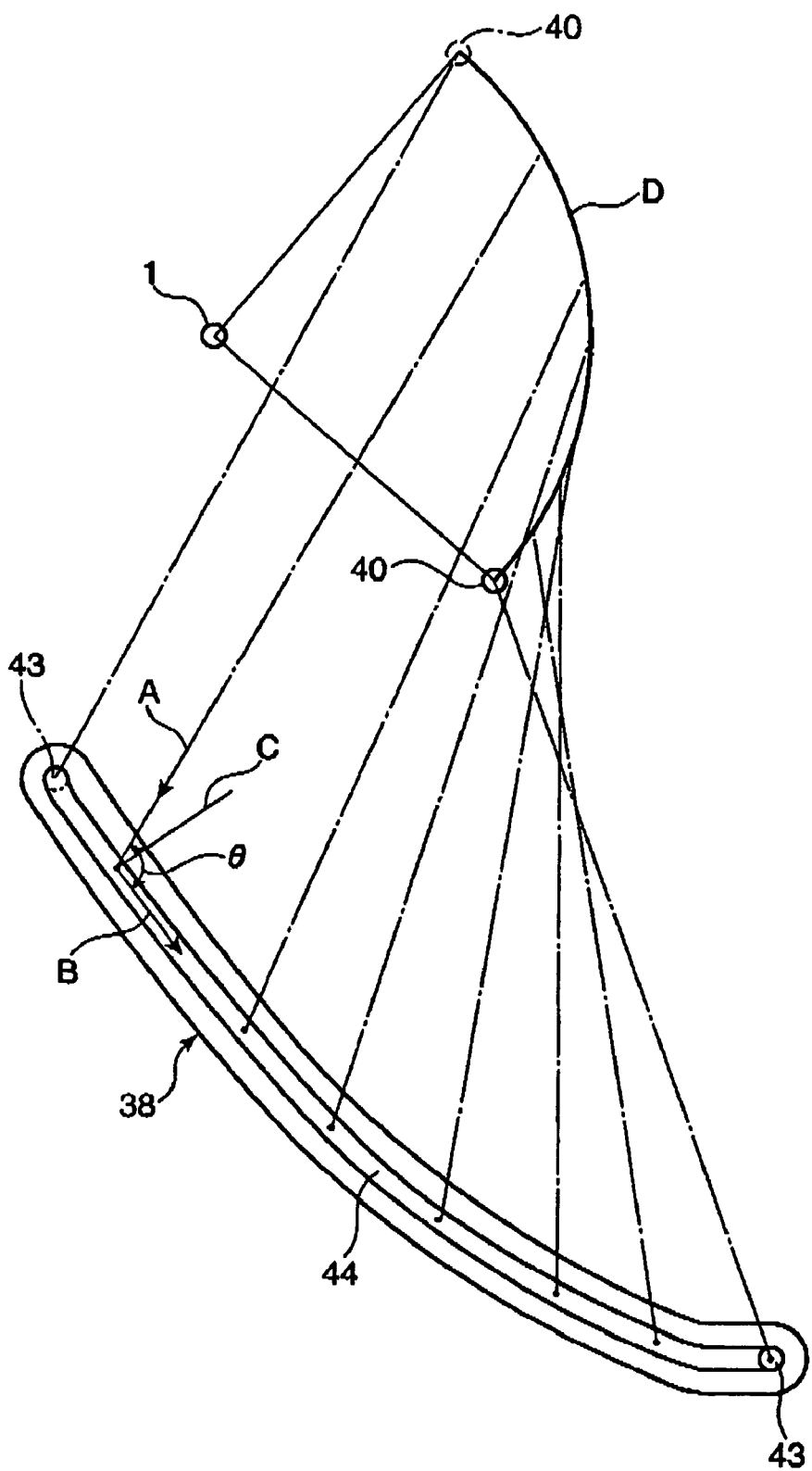
FIG. 13 is an explanatory view showing a pull-bar guide direction and others of the guide rail.

More specifically, as shown in FIG. 13, during the closing operation of the tailgate 3, in the side view of the vehicle, the closing operation-based driving force is input in a direction A along a line connecting the upper-end pivoted portion 40 and the lower-end pivoted portion 43 of the coupling link 33. The input direction A of the closing operation-based driving force and the guide direction B of the guide rail 38 is set to be located frontward relative to a line extending in a direction C orthogonal to the guide direction B of the guide rail 38 so as to allow an angle $\theta$ between the input direction A of the closing operation-based driving force and the guide direction B of the guide rail 38 to be set at an obtuse angle.

Along with the progress of the closing operation of the tailgate 3, the input direction A of the closing operation-based driving force comes closer to a vertical direction. Further, in a final stage of the closing operation, the input direction A of the closing operation-based driving force acceleratingly decreases. Thus, in response to this change, the guide direction B of the guide rail 38 is gradually changed to a horizontal direction to maintain the angle $\theta$ between the input direction A of the closing operation-based driving force and the guide direction B of the guide rail 38 at an approximately constant value. In FIG. 13, an arc-shaped line indicated by the reference code D is a locus of the upper-end pivoted portion 40 corresponding to the closing operation of the tailgate 3, and the reference code 1 is an upper hinge serving as a pivot of the tailgate 3.

Figure 14A:
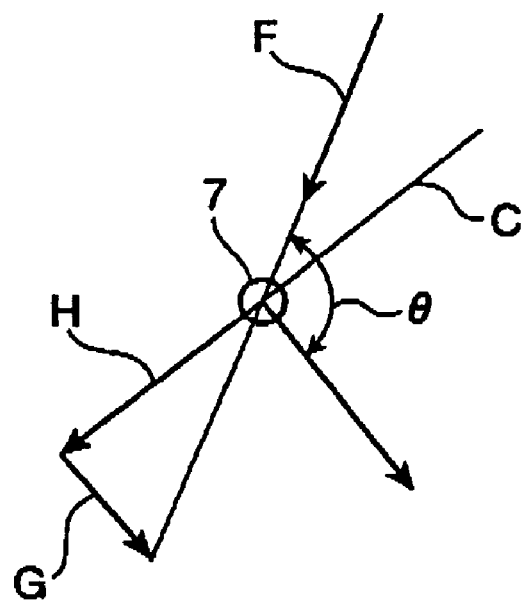
FIGS. 14A & 14B, each is an explanatory diagram showing a relationship between a closing-operation direction and a guide direction.
Figure 14B:
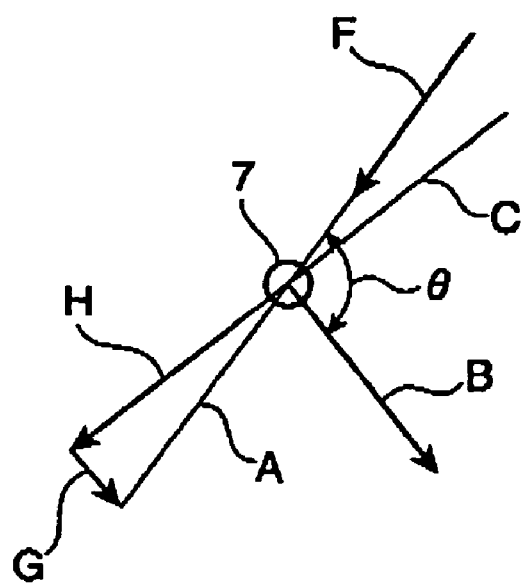

As above, the angle $\theta$ between the input direction A of the closing operation-based driving force and the guide direction B of the guide rail 38 is set at an obtuse angle. Thus, as shown in FIG. 14A, in response to the closing operation-based driving force F input from the lower-end pivoted portion 43 of the coupling link 33a to the pull bar 7, a moving force G will act to allow the lower-end pivoted portion 43 of the coupling link 33 and the pull bar 7 to be slidingly displaced along the guide rails 38. Further, as shown in FIG. 14B, in response to a decrease in the angle $\theta$, the moving force G decreases, and a component force H of the closing operation-based driving force F acting in a direction C orthogonal to the guide direction B increases. Thus, a frictional force expressed as a value calculated by multiplying the component force H by a friction coefficient $\mu$, i.e., a frictional resistance caused when the lower-end pivoted portion 43 of the coupling link 33 is slidingly moved along the guide rails 38, is apt to increase.

According to an experimental test on a frictional force caused when the pull bar 7 and the lower-end pivoted portion 43 of the coupling link 33 is slidingly displaced downwardly, it has been proven that, if the angle $\theta$ is 110° or more, he pull bar 7 and the lower-end pivoted portion 43 of the coupling link 33 can be slidingly displaced downwardly against the frictional force. Based on this experimental result, it has been verified that, when the angle $\theta$ between the input direction A of the closing operation-based driving force and the guide direction B of the guide rail 38 is set at 110° or more, the pull bar 7 can be slidingly displaced along the guide rails smoothly correspondingly to a driving force input from the coupling link 33 into the pull bar 7 during the closing operation the tailgate 3, to move the tonneau cover 6 from the upper open position to the lower close position.

In an initial stage of the closing operation the tailgate 3. i.e., when the upper-end pivoted portion 40 is located at the upper end of the guide rail 38, a relatively large frictional force acts. For slidingly displacing the pull bar 7 smoothly against such a static frictional force to move the tonneau cover 6 from the upper open position to the lower close position, the angle $\theta$ between the input direction A of the closing operation-based driving force and the guide direction B of the guide rail 38, at the upper end of the guide rail 38 is preferably set at a value greater than that the vertically intermediate portion and the lower portion of the guide rail 38, for example, at about 135°.

Further, in a portion of the guide rail 38 where the angle $\theta$ between the input direction A of the closing operation-based driving force and the guide direction B of the guide rail 38 is changed, i.e., a portion located between the upper end of the guide rail 38 where the angle $\theta$ is set at a relatively large value (about 135°) than that of the lower portion, and the vertically intermediate portion the guide rail 38 where the angle $\theta$ is set at a relatively small value (about 110°, the pull-bar guide direction B of the guide rail 38 is arranged such that the angle $\theta$ is continuously (linearly) changed from 135° to 110°.

The pull-bar guide direction B at the lower end of the guide rail 38, i.e., the pull-bar guide direction B in the final stage of the closing operation the tailgate 3, is set at an approximately horizontal direction, as shown in FIG. 13. Further, as shown in FIG. 9, in the side view of the vehicle, the upper portion of the guide rail 38 is located in frontwardly spaced-apart relation to the rear opening 2 defined by the rear pillars 18 extending approximately linearly in a downwardly-inclined posture relative to the rearward direction, and the lower portion of the guide rail 38 is located closer to the rear opening 2.

As above, the tonneau-cover opening/closing mechanism according to the second embodiment includes the coupling link 33 coupling the pair of right and left guides rails slidably supporting the right and left ends of the pull bar 7 provided at the rear end of the tonneau cover 6, and the right and left ends of the pull bar 7, to the tailgate 3. The coupling link 33 is adapted to transfer a driving force F based on the opening/closing operation of the tailgate 3, to the pull bar 7 therethrough, so as to allow the rear end of the tonneau cover 6 to be moved upwardly and downwardly in conjunction with a sliding displacement of the pull bar 7 along the guide rail 38 according to the driving force F. The guide rail 38 is formed, in the side view of the vehicle, to include the vertically central portion curved to protrude frontwardly and downwardly, and have a pull-bar guide direction for guiding the pull-bar 7, which is arranged such that, during the closing operation of the tailgate 7, an angle between the pull-bar guide direction B of the guide rail 38 and the input direction A of the closing operation-based driving force F to be applied from the coupling link 33 to the pull bar 7, is set at an obtuse angle. Thus, the rear end of the tonneau cover 6 can be moved upwardly and downwardly in conjunction with the opening/closing operation of the tailgate 3 in a simplified structure to move the tonneau cover 6 between the lower close position and the upper open position.

Specifically, the pull bar 7 is adapted to be slidingly displaced along the guide rails 38 in conjunction with the opening/closing operation of the tailgate 3 to move the rear end of the tonneau cover 6 upwardly and downwardly. Thus, the rear end of the tonneau cover 6 can be moved upwardly and downwardly in conjunction with the opening/closing operation of the tailgate 3 without providing driving means separately to move the tonneau cover 6 between the lower close position and the upper open position. During the opening operation of the tailgate 3, the rear end of the tonneau cover 6 can be moved to the upper open position to facilitate an operation of putting/taking articles in/out of the rear cargo compartment 5. Further, during the closing operation of the tailgate 3, the rear end of the tonneau cover 6 can be moved to the lower close position to cover articles in the rear cargo compartment 5.

Thus, the right and left ends of the pull bar 7 can be constantly supported by the guide rails 38 without employing particular means, such as the protrudable pins capable of protruding in a variable manner as disclosed in the aforementioned conventional technique to provide a simplified structure. Further, the lower end of the guide rail 38 can be located outwardly relatively the rear opening 2 as indicated by the solid line in FIG. 11 while preventing the lower end of the guide rail 38a from being located inwardly relative to the rear opening 2, due to the right and left side edges of the rear opening inclined in an upward tapering manner in the rear view of the vehicle, as indicated by the broken line in FIG. 10. This makes it possible to prevent the guide rails 38 from hindering the operation of putting/taking articles on/out of the rear cargo compartment 5 and sufficiently ensure the width dimension of the tonneau cover 6 to be disposed between the guide rails 38.

Further, the guide direction B of the guide rail 38 is arranged such that the angle θ between the input direction A of the closing operation-based driving force F acting from the coupling link 33 to the pull bar 7 and the guide direction B of the guide rail 38, during the closing operation the tailgate 3, is set at an obtuse angle. Thus, even when the guide rail 38 is positioned frontward relative to the rear opening 2 of the vehicle by a given distance, the rear end of the tonneau cover can be smoothly moved upwardly and downwardly in conjunction with the closing operation the tailgate 3 while suppressing an increase in fictional force caused when the pull bar 7 is slidingly displaced along the guide rails 38 during the closing operation of the tailgate 3 in an open state.

That is, an inclination angle of the closing operation-based driving force to be input from the tailgate 3 in the open state into the pull bar 7 through the coupling link 33, with respect to a horizontal plane, becomes smaller as the positing of the guide rail 38 is shifted toward an front end of the vehicle relative to the rear opening of the vehicle, and the input direction A of the closing operation-based driving force comes closer to a horizontal direction. Consequently, an effective force for the downward movement along the guide rail is apt to decrease . In this regard, the guide rail 38 formed to include the vertically central portion curved to protrude frontwardly and downwardly, in the side view of the vehicle, and the guide direction B of the guide rail 38 is arranged such that the angle θ between the input direction A of the closing operation-based driving force F acting from the coupling link 33 to the pull bar 7 and the guide direction B of the guide rail 38, during the closing operation the tailgate 3, is set at an obtuse angle. In this case, even if the guide rail 38 is positioned frontward relative to the rear opening 2 of the vehicle by a relatively long distance, a force G allowing the pull bar 7 and the lower-end pivoted portion 43 of the coupling link 33 to be slidingly displaced downward according to the closing operation-based driving force F can be sufficiently ensured as shown in FIG. 14A to smoothly drive the rear end of the tonneau cover 6 upwardly and downwardly in conjunction with the opening/closing operation the tailgate 3.

In the second embodiment, the angle θ between the input direction A of the closing operation-based driving force and the guide direction B of the guide rail 38 is set at a larger value in an upper end of the guide rail 38 than in the vertically intermediate portion of the guide rail 38. Thus, in the initial stage of the closing operation of the tailgate 3 involving static friction, this structure has an advantage of being able to sufficiently ensure the moving force G to be input from the coupling link 33 into the pull bar 7 according to the closing operation-based driving force F so as to allow the lower-end pivoted portion 43 of the coupling link 33 and the pull bar 7 to be slidingly displaced downwardly, and to suppress the frictional resistance expressed as a value calculated by multiplying the component force H of the closing operation-based driving force F acting in the direction C orthogonal to the guide direction B of the guide rail 38 by a friction coefficient μ, to a sufficiently low value so as to allow the closing operation of the tailgate 3 to be smoothly performed.

In the second embodiment, the pull-bar guide direction B in the lower end of the guide rail 7 is set at an approximately horizontal direction. This provides, an advantage of being able to effectively prevent the occurrence of an undesirable situation where a guide position of the pull bar 7 is changed to a certain extent in a close position of the tailgate 3 due to production error or deformation during use, and consequently a vertical position of the tonneau cover 6 is changed. This makes it possible to prevent an intended height and direction of the tonneau cover 6 from being changed when the tonneau cover 6 is moved downwardly to the close position.

Particularly, in a certain portion of the guide rail 38 where the angle θ between the pull-bar guide direction B and the input direction A of the closing operation-based driving force is changed, the angle θ is continuously changed. This makes it possible to effectively prevent the occurrence of wobbling during a sliding movement of the pull bar 7 due to sudden change of the angle θ at the portion, to allow the pull bar 7 to be slidingly displaced along the guide rails 38 smoothly.

In the second embodiment, the guide rail 38 is positioned such that, in the side view of the vehicle, the upper portion of the guide rail 38 is located in frontwardly spaced-apart relation to the rear opening 2 extending approximately linearly in a downwardly-inclined posture relative to the rearward direction, and the lower portion of the guide rail 38 is located closer to the rear opening 2, so that, when the tailgate 3 is closed, the pull bar 7 and the rear end of the tonneau cover 6 are moved to a position adjacent to the side edges of the rear opening 2 while positioning the right and left guide rails 38 parallel to each other and sufficiently ensuring the distance between the guide rails 38.

The above upper portion of the guide rail 38 located in frontwardly spaced-apart relation to the rear opening 2 makes it possible to prevent the upper portion of the coupling link 33 being moving upwardly along the guide rail 38 during the opening operation of the tailgate 3, from interfering with the side edge of the rear pillar 38. Further, the right and left guide rails 38 can be positioned parallel to each other while sufficiently ensuring the distance between the guide rails without interference between the guide rails 38 and the rear pillars 18 in the rear view of the vehicle. Further, when the tailgate in a closed state, the pull bar 7 and the rear end of the tonneau cover 6 are moved to a position adjacent to the side edges of the rear opening 2. Thus, approximately the entire area of the rear cargo compartment S including a rear region thereof can be advantageously covered by the tonneau cover 6 to provide a sufficient function of covering articles, to the tonneau cover.

In the second embodiment, the rail-side pivoted point 12 of the coupling link 33 serving as a coupling point of the lower-end pivoted portion 43 to the guide rail 38 is set to be located outwardly relative to the tailgate-side pivoted point L1 of the coupling link 33 serving as a coupling point of the upper-end pivoted portion 40 to the tailgate 3, in the rear view of the vehicle. This makes it possible to prevent the upper portion of the coupling link 33 from interfering the side edge of the rear opening 2 during the opening operation of the tailgate 3, and allow the rear end of the tonneau cover 6 to be moved up to a sufficient height during the opening operation of the tailgate 3. Further, the guide rails 38 can be positioned laterally outward to sufficiently ensure the width dimension of the tonneau cover 6.

Specifically, if the upper end of the guide rail 38 is designed to extend up to a position adjacent to an upper edge of the rear opening 2 to allow the rear end of the tonneau cover 6 to be largely moved upwardly during the opening operation of the tailgate 3, the upper portion of the coupling link 33 moved upward along the guide rail 34 during the opening operation of the tailgate 3 is likely to interfere with the side edge of the rear opening 2 inclined in an upwardly tapering manner in the rear view of the vehicle, moreover, if the guide rail 38 connected with the lower-end pivoted portion 43 of the coupling link 33 is positioned inwardly, the distance between the right and left guide rails 38 will inevitably decrease and hinder the operation of putting/taking articles in/out of the rear cargo compartment (see the broken line in FIG. 10).

In contrast, the rail-side pivoted point L2 of the coupling link 33 set to be located outwardly relative to the tailgate-side pivoted point L1 of the coupling link 33 as in the second embodiment provides advantages that even when the upper end of the guide rail 38 is designed to extend up to a position adjacent to an upper edge of the rear opening 2 to allow the rear end of the tonneau cover 6 to be largely moved upwardly during the opening operation of the tailgate 3, the upper portion (downwardly-extending portion 41) of the coupling link 33 located adjacent to the tailgate-side pivoted point L1 can be located inwardly relative to the side edge of the rear opening 2. This makes it possible to prevent the upper end of the coupling link 33 from interfering with the side edge of the rear opening 2. Further, the rail-side pivoted point L1 is set to be located outwardly relative to the tailgate-side pivoted point L2. This makes it possible to increase the width dimension of the tonneau cover 6 to be disposed between the guide rails 38, and prevent the guide rails 38 from hindering the operation of putting/taking articles in/out of the rear cargo compartment 5.

In the second embodiment, the coupling link 33 is positioned such that the bent portion 42 thereof extends obliquely frontward relative to the downwardly-extending portion 41 to form the vertically intermediate portion in an L shape in the side view of the vehicle. Thus, even when the upper-end pivoted point 40 of the coupling link 33 is moved to the upper end of the guide rail 38 after the tailgate 3 is opened, as indicated by the two-dot chain line in FIG. 9, this arrangement can effectively prevent the upper portion of the coupling link 33 from coming into contact with the upper edge of the rear opening 2.

In the second embodiment, each of the downwardly-extending portion 41 and the bent portion 42 of the coupling link 33 is disposed in an inclined posture to extend downwardly and outwardly in the rear view of the vehicle, so that each of the downwardly-extending portion 41 and the bent portion 42 of the coupling link 33 is located along the side edge of rear opening 2 during the closing operation of the tailgate 3. This makes it possible to prevent the upper portion of the coupling link 33 from interfering with the side edge of the rear opening 2 during the opening operation of the tailgate while preventing the coupling link 33 from hindering rearward visibility.

In summary, in order to achieve the above object, as set forth in the one aspect of the invention, the present invention provides a vehicle rear structure which comprises a tailgate adapted to openably cover a rear opening defined between a pair of right and left rear pillars formed in a rear of a vehicle body, a tonneau cover adapted to be disposed to cover an upper side of a rear cargo compartment located in front of the rear opening, a pull bar provided at a rear end of the tonneau cover, and a pair of right and left guide rails slidably supporting respective opposite right and left ends of the pull bar. The pull bar is adapted to be slidingly displaced along the guide rails so as to allow the rear end of the tonneau cover to be moved upwardly and downwardly. The vehicle rear structure is characterized in that the right and left guide rails are positioned parallel to each other, when viewed from a rear end of the vehicle, i.e., in a rear view of the vehicle. Each of the guide rails has an upper portion located at a position overlapping a corresponding one of the rear pillars in the rear view of the vehicle, and in front of the rear pillar, when viewed from a lateral side surface of the vehicle, i.e., in a side view of the vehicle. Further, each of the guide rails has a lower portion located at a position overlapping the rear pillar in the side view of the vehicle.

As a $2^{nd}$ aspect of the present invention, the upper portion of the guide rail is located at a position overlapping a quarter window positioned in front of the rear pillar, in the side view of the vehicle, and at a position adjacent to an inward surface of the quarter window in the rear view of the vehicle.

As a $3^{rd}$ aspect of the present invention, in the vehicle rear structure, the quarter window has a periphery including an opaque light-shielding region, and the upper portion of the guide rail is located at a position, overlapping the light-shielding region, in the side view of the vehicle.

As a 4th aspect of the present invention, in the vehicle rear structure, each of the rear pillars is inclined such that an upper end thereof is located inwardly relative to a lower end thereof in the rear view of the vehicle, and the guide rail is positioned such that the upper portion thereof is located most adjacent to the quarter window in the rear view of the vehicle.

As a 5th aspect of the present invention, in the vehicle rear structure, the rear pillar is formed with a flange on the side of the quarter window, and the upper portion of the guide rail is located along the flange in the side view of the vehicle.

As a 6th aspect of the present invention, the vehicle rear structure includes an inner panel and an outer panel which have flanges joined together to form the rear pillar in such a manner as to extend vertically in the rear of the vehicle body, a quarter window positioned in front of the rear pillar, and a trim member covering an inward sidewall surface of the rear pillar. The trim member includes a sidewall plate extending rearwardly from a front edge thereof in a given inclination direction to have a rear edge located inwardly relative to the front edge, in a horizontal cross-sectional view thereof, and a front wall plate extending continuously and rearwardly from the front edge of the sidewall plate in an inclination direction opposite to that of the sidewall plate to have a rear edge oriented toward a rear edge portion of the quarter window. A portion of the trim member consisting of the front wall plate and an frontward portion of the sidewall plate continuous with the front wall, and a portion of the rear pillar consisting of the flange located along an front edge thereof and a body of the inner panel continuous with the flange, define an in-trim storage space therebetween. The guide rail is disposed in the trim-based storage space.

As a 7th aspect of the present invention, the vehicle rear structure includes a coupling link coupling the right and left ends of the pull bar to the tailgate. The coupling link is adapted to transfer a driving force based on an opening/closing operation of the tailgate, to the pull bar therethrough, so as to allow the rear end of the tonneau cover to be moved upwardly and downwardly in conjunction with a sliding displacement of the pull bar along the guide rail according to the driving force. The guide rail is formed, in the side view of the vehicle, to include a vertically central portion curved to protrude frontwardly and downwardly, and have a pull-bar guide direction for guiding the pull-bar, which is arranged such that, during the closing operation of the tailgate, an angle between the pull-bar guide direction and an input direction of the closing operation-based driving force to be applied from the coupling link to the pull bar, is set at an obtuse angle.

As a 8th aspect of the present invention, in the vehicle rear structure, the angle between the pull-bar guide direction and the input direction of the closing operation-based driving force is set at a larger value in an upper end of the guide rail than in a vertically intermediate portion of the guide rail.

As a 9th aspect of the present invention, in the vehicle rear structure, the pull-bar guide direction is set at an approximately horizontal direction in a lower end of the guide rail.

As a 10th aspect of the present invention, in the vehicle rear structure, the angle between the pull-bar guide direction and the input direction of the closing operation-based driving force is continuously changed in a certain portion of the guide rail where the angle is changed.

As a 11th aspect of the present invention, the vehicle rear structure includes a coupling link coupling the right and left ends of the pull bar to the tailgate. The coupling link is adapted to transfer a driving force based on an opening/closing operation of the tailgate, to the pull bar therethrough so as to allow the rear end of the tonneau cover to be moved upwardly and downwardly in conjunction with a sliding displacement of the pull bar along the guide rail according to the driving force. In the rear view of the vehicle, a coupling point of the coupling link to the guide rail is set to be located outwardly relative to a coupling point of the coupling link to the tail gate.

As a 12th aspect of the present invention, in the vehicle rear structure, the coupling link has a vertically intermediate portion located rearwardly relative to the remaining portion so as to allow the coupling link to be form in an L shape, in the side view of the vehicle.

As a 13th aspect of the present invention, in the vehicle rear structure, the right and left rear pillars are inclined in upwardly tapering relation to each other, in the rear view of the vehicle, and the coupling link is inclined to extend along a side edge of the rear pillar.

As above, in vehicle rear structure of the present invention as set forth in the 1st aspect of the present invention, the right and left guide rails are positioned parallel to each other in a rear view of the vehicle, and the upper portion of the guide rail is located at a position overlapping the rear pillar in the rear view of the vehicle and in front of the rear pillar in a side view of the vehicle. Further, the lower portion of the guide rail is located at a position overlapping the rear pillar in the side view of the vehicle, and on the inside of said rear pillar in the rear view of the vehicle. Thus, the rear end of the tonneau cover can be displaced upwardly and downwardly along the guide rails in a simplified structure without disadvantages, such as deterioration in rearward visibility, due to decrease in distance between the right and left guide rails.

In the vehicle rear structure as set forth in the 2nd aspect of the present invention, in a vehicle having a quarter window positioned in front of a rear pillar, the upper portion of the guide rail is located at a position overlapping the quarter window in the side view of the vehicle, and at a position adjacent to an inward surface of the quarter window in the rear view of the vehicle. This vehicle rear structure has an advantage that the distance of the right and left guide rails can be further increased while preventing the upper portion of the guide rail from interfering with the rear pillar.

In the vehicle rear structure as set forth in the 3rd aspect of the present invention, the light-shielding region can prevent the guide rail from becoming visible from outside even through the quarter window if the upper portion of the guide rail is located adjacent to the inward surface of the quarter window in the side view of the vehicle. Thus, an aesthetic appearance of the vehicle can be adequately maintained.

In the vehicle rear structure as set forth in the 4th aspect of the present invention, in a vehicle having a rear pillar inclined such that an upper end thereof is located inwardly relative to a lower end thereof in the rear view of the vehicle, the guide rail is positioned such that the upper portion thereof is located most adjacent to the quarter window. This vehicle rear structure can prevent the guide rail from interfering with the rear pillar, and can maximize the distance between the right and left guide rails while allowing the guide rails to be positioned parallel to each other.

In the vehicle rear structure as set forth in the 5th aspect of the present invention, the upper portion of the guide rail is located along the flange of the rear pillar formed on the side of the quarter window. Thus, the upper portion of the guide rail can be arranged while keeping away from a body of the rear pillar. Therefore, this vehicle rear structure has advantages of being able to ensure the distance between the right and left guide rails while preventing the guide rail from interfering with the rear pillar, and to effectively prevent the guide rail from becoming visible from outside through the quarter window.

In the vehicle rear structure as set forth in the 6$^{th}$ aspect of the present invention, the pair of right and left guide rails slidably supporting the right and left ends of the pull bar provided at the rear end of the tonneau cover are disposed in the trim-based storage space. This vehicle rear structure has advantages of being able to sufficiently ensure the distance between the right and left guide rails while preventing deterioration in aesthetic value of a passenger compartment due to exposure of the guide rails, so as to prevent deterioration in rearward visibility and in user-friendliness during an operation of putting and taking articles in/out of the rear cargo compartment, due to obstruction/hindrance of the guide rails caused by a decrease in the distance between the right and left guide rails, and sufficiently ensure a width dimension of the tonneau cover to be disposed between the guide rails.

In the vehicle rear structure as set forth in the 7$^{th}$ aspect of the present invention, the rear end of the tonneau cover can be moved upwardly and downwardly in conjunction with the tailgate opening/closing operation without providing driving means separately. In addition, the right and left guide rails can be positioned parallel to each other while sufficiently ensuring the distance therebetween in the rear view of the vehicle. Further, in an initial stage of the operation of closing the tailgate in the open position, this vehicle rear structure has an advantage of being able to suppress an increase in frictional resistance during a sliding movement of the pull bar along the guide rails.

In the vehicle rear structure as set forth in the 8$^{th}$ aspect of the present invention, in the initial stage of the tailgate closing operation involving static friction, this vehicle rear structure has an advantage of being able to sufficiently ensure a driving force to be input from the coupling link into the pull bar based on the closing operation so as to allow the pull bar to be slidingly displaced downwardly, and to suppress the frictional resistance during the closing operation to a sufficiently low value so as to smoothly move the pull bar upwardly and downwardly based on the tailgate opening/closing operation.

The vehicle rear structure as set forth in the 9$^{th}$ aspect of the present invention has an advantage of being able to effectively prevent the occurrence of an undesirable situation where a guide position of the pull bar is changed to a certain extent in a close position of the tailgate due to production error or deformation during use, and consequently a vertical position of the tonneau cover is changed. This makes it possible to prevent an intended height and direction of the tonneau cover from being changed when the tonneau cover is moved downwardly to the close position.

In the vehicle rear structure as set forth in the 10$^{th}$ aspect of the present invention, in a certain portion of the guide rail where the angle between the pull-bar guide direction and the input direction of the closing operation-based driving force is changed, the angle is continuously changed. Thus, this vehicle rear structure can effectively prevent the occurrence of wobbling during a sliding movement of the pull bar due to sudden change of the above angle, to allow the pull bar to be slidingly displaced along the guide rails smoothly.

In the vehicle rear structure as set forth in the 11$^{th}$ aspect of the present invention, the rear end of the tonneau cover can be moved upwardly and downwardly in conjunction with the tailgate opening/closing operation without providing driving means separately. In addition, the right and left guide rails can be positioned parallel to each other while sufficiently ensuring the distance therebetween in the rear view of the vehicle. Further, even when the upper end of the guide rail is designed to extend up to a position adjacent to an upper edge of the rear opening to allow the rear end of the tonneau cover to be largely moved upwardly during the tailgate opening operation, an upper portion of the coupling link located adjacent to the coupling point of the coupling link to the tailgate can be located inwardly relative to a side edge of the rear opening. This makes it possible to prevent the upper end of the coupling link from interfering with the side edge of the rear opening. Further, a coupling point of the coupling link to the guide rail is set to be located outwardly relative to a coupling point of the coupling link to the tail gate. Thus, this vehicle rear structure has advantages of being able to sufficiently ensure the distance between the right and left guide rails so as to increase the width dimension of the tonneau cover to be disposed between the guide rails, and prevent the guide rails from hindering the operation of putting/taking articles in/out of the rear cargo compartment.

In the vehicle rear structure as set forth in the 12$^{th}$ aspect of the present invention, even in a vehicle where the upper end of the guide rail extends up to a position adjacent to the upper edge of the rear opening, and the upper portion of the guide rail is located in front of the rear opening, the coupling link can be bypassingly moved behind the upper edge of the rear opening through vertically intermediate portion. Thus, this vehicle rear structure has an advantage of being able to effectively prevent the coupling link from coming into contact with the upper edge of the rear opening.

In the vehicle rear structure as set forth in the 13$^{th}$ aspect of the present invention, the coupling link is disposed to extend along a side edge of the rear opening. Thus, this vehicle rear structure has an advantage of being able to prevent the upper portion of the coupling link from interfering with the side edge of the rear opening during the tailgate opening operation while preventing the coupling link from hindering rearward visibility.

This application is based on Japanese patent application serial nos. 2005-336849, 2005-336850, 2005-351117, and 2005-351118, filed with Japan Patent Office on Nov. 22, 2005, Nov. 22, 2005, Dec. 5, 2005, and Dec. 5, 2005, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle rear structure comprising:
   a tailgate adapted to openably cover a rear opening defined between a pair of right and left rear pillars formed in a rear of a vehicle body, the vehicle body having a front end and a rear end and longitudinal axis;
   a tonneau cover adapted to be disposed to cover an upper side of a rear cargo compartment located in front of said rear opening;
   a pull bar provided at a rear end of said tonneau cover; and
   a pair of right and left guide rails slidably supporting respective opposite right and left ends of said pull bar,
   wherein said pull bar is adapted to be slidingly displaced along said guide rails so as to allow the rear end of said tonneau cover to be moved upwardly and downwardly,
   wherein said right and left guide rails are parallel to each other;
   each of said guide rails has an upper end and a lower end, the guide rail extends linearly between the upper end and lower end, said upper end being located at a position overlapping a corresponding one of the rear pillars as seen directly at the pillar along the longitudinal axis of the vehicle from the rear end toward the front end of the vehicle, said upper end being position in front of said rear pillar as seen from a firect side view of said rear pillar of the vehicle, wherein the direct side view is a line of sight at said rear pillar and the line of sight intersects the longitudinal axis of the vehicle at about 90 degrees, and said lower end being located at a position overlapping said rear pillar as seen from the direct side view of the vehicle.

2. The vehicle rear structure as defined in claim 1, wherein the upper end of said guide rail is located at a position overlapping a quarter window positioned in front of the rear pillar, as seen from the direct side view of the vehicle, and at a position adjacent to an inward surface of said quarter window as seen from the rear end toward the front end of the vehicle of the vehicle.

3. The vehicle rear structure as defined in claim 2, wherein: said quarter window has a periphery including an opaque light-shielding region; and
the upper portion of said guide rail is located at a position overlapping said light-shielding region as seen from the direct side view of the vehicle.

4. The vehicle rear structure as defined in claim 3, wherein each of said rear pillars is inclined such that an upper end thereof is located inwardly relative to a lower end thereof, as seen from the rear toward the front of the vehicle, wherein said guide rail is position such that said upper end thereof is located most adjacent to said quarter window as seen from the rear end toward the front of the vehicle.

5. The vehicle rear structure as defined in claim 2, wherein: said rear pillar is formed with a flange on the side of said quarter window; and
the upper end of said guide rail is located along said flange in the direct side view of the vehicle.

6. The vehicle rear structure as defined in claim 1, which includes:
an inner panel and an outer panel which have flanges joined together to form said rear pillar in such a manner as to extend vertically in the rear of the vehicle body;
a quarter window positioned in front of said rear pillar; and
a trim member covering an inward sidewall surface of said rear pillar, said trim member including:
a sidewall plate extending rearwardly from a front edge thereof in a given inclination direction to have a rear edge located inwardly relative to said front edge, in a horizontal cross-sectional view thereof; and
a front wall plate extending continuously and rearwardly from the front edge of said sidewall plate in an inclination direction opposite to that of said sidewall plate to have a rear edge oriented toward a rear edge portion of said quarter window,
wherein:
a portion of said trim member consisting of said front wall plate and an frontward portion of said sidewall plate continuous with said front wall, and a portion of said rear pillar consisting of the flange located along an front edge thereof and a body of said inner panel continuous with said flange, define an in-trim storage space therebetween; and
said guide rail is disposed in said trim-based storage space.

7. The vehicle rear structure as defined in claim 1, which includes a coupling link coupling the right and left ends of said pull bar to said tailgate, said coupling link being adapted to transfer a driving force based on an opening/closing operation of said tailgate, to the pull bar therethrough, so as to allow the rear end of said tonneau cover to be moved upwardly and downwardly in conjunction with a sliding displacement of said pull bar along said guide rail according to said driving force,
wherein:
said guide rail is formed, the direct side view of the vehicle, to include a vertically central portion curved to protrude frontwardly and downwardly, and have a pull-bar guide direction for guiding said pull-bar, which is arranged such that, during the closing operation of said tailgate, an angle between said pull-bar guide direction and an input direction of said closing operation-based driving force to be applied from said coupling link to said pull bar, is set at an obtuse angle.

8. The vehicle rear structure as defined in claim 7, wherein said angle between the pull-bar guide direction and the input direction of the closing operation-based driving force is set at a larger value in an upper end of said guide rail than in a vertically intermediate portion of said guide rail.

9. The vehicle rear structure as defined in claim 8, wherein said pull-bar guide direction is set at an approximately horizontal direction in a lower end of said guide rail.

10. The vehicle rear structure as defined in claim 9, wherein said angle between the pull-bar guide direction and the input direction of the closing operation-based driving force is continuously changed in a certain portion of said guide rail where said angle is changed.

11. The vehicle rear structure as defined in claim 1, which includes a coupling link coupling the right and left ends of said pull bar to said tailgate, said coupling link being adapted to transfer a driving force based on an opening/closing operation of said tailgate, to the pull bar therethrough, so as to allow the rear end of said tonneau cover to be moved upwardly and downwardly in conjunction with a sliding displacement of said pull bar along said guide rail according to said driving force, wherein, as seen directly at the pillar along the longitudinal axis of the vehicle from the rear end toward the front end of the vehicle, a coupling point of said coupling link to said guide rail is set to be located outwardly relative to a coupling point of said coupling link to said tailgate.

12. The vehicle rear structure as defined in claim 11, wherein said coupling link has a vertically intermediate portion located rearwardly relative to the remaining portion so as to allow said coupling link to be form in an L-shape in the direct side view of the vehicle.

13. The vehicle rear structure as defined in claim 12, wherein said right and left rear pillars are inclined in upwardly tapering relation to each other, as seen directly at the at the pillar along the longitudinal axis of the vehicle from the rear end toward the front end of the vehicle, wherein said coupling link is inclined to extend along a side edge of said rear pillar.

* * * * *